(12) United States Patent
Kalach et al.

(10) Patent No.: US 9,823,981 B2
(45) Date of Patent: Nov. 21, 2017

(54) BACKUP AND RESTORE STRATEGIES FOR DATA DEDUPLICATION

(75) Inventors: Ran Kalach, Bellevue, WA (US); Chun Ho (Ian) Cheung, Bellevue, WA (US); Paul Adrian Oltean, Redmond, WA (US); Mathew James Dickson, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 988 days.

(21) Appl. No.: 13/045,692

(22) Filed: Mar. 11, 2011

(65) Prior Publication Data

US 2012/0233417 A1    Sep. 13, 2012

(51) Int. Cl.
    G06F 11/14      (2006.01)
    G06F 3/06       (2006.01)

(52) U.S. Cl.
    CPC ........ G06F 11/1469 (2013.01); G06F 3/0641 (2013.01); G06F 11/1451 (2013.01); G06F 11/1453 (2013.01)

(58) Field of Classification Search
    CPC ...... G06F 3/0608; G06F 3/064–3/0641; G06F 3/0646–3/0647; G06F 3/065; G06F 3/0655; G06F 11/1446–11/1469
    USPC .................................. 711/161–162
    See application file for complete search history.

(56) References Cited

U.S. PATENT DOCUMENTS

| | | | |
|---|---|---|---|
| 6,003,044 A  * | 12/1999 | Pongracz | ............ G06F 11/1448 |
| 7,246,254 B2 | 7/2007 | Alur et al. | |
| 7,415,585 B1 * | 8/2008 | Rossi | .................. G06F 11/1458 |
| | | | 711/161 |
| 7,870,409 B2 | 1/2011 | Murase | |

(Continued)

FOREIGN PATENT DOCUMENTS

| | | |
|---|---|---|
| CN | 101339494 A | 1/2009 |
| CN | 101855619 A | 10/2010 |

(Continued)

OTHER PUBLICATIONS

Rao, Goutham., "End to End Dedupe", Retrieved at << http://onlinestorageoptimization.com/index.php/tag/dedupe-for-online/ >>, Oct. 14, 2009, pp. 7.

(Continued)

Primary Examiner — Nicholas Simonetti
(74) Attorney, Agent, or Firm — Fiala & Weaver P.L.L.C.

(57) ABSTRACT

Techniques for backup and restore of optimized data streams are described. A chunk store includes each optimized data stream as a plurality of chunks including at least one data chunk and corresponding optimized stream metadata. The chunk store includes data chunks in a deduplicated manner. Optimized data streams stored in the chunk store are identified for backup. At least a portion of the chunk store is stored in backup storage according to an optimized backup technique, an un-optimized backup technique, an item level backup technique, or a data chunk identifier backup technique. Optimized data streams stored in the backup storage may be restored. A file reconstructor includes a callback (Continued)

module that generates calls to a restore application to request optimized stream metadata and any referenced data chunks from the backup storage. The file reconstructor reconstructs the data streams from the referenced data chunks.

20 Claims, 20 Drawing Sheets

(56) References Cited

U.S. PATENT DOCUMENTS

| | | | | |
|---|---|---|---|---|
| 7,941,619 | B1* | 5/2011 | Rossi | 711/162 |
| 8,224,875 | B1* | 7/2012 | Christiaens et al. | 707/813 |
| 8,260,750 | B1* | 9/2012 | Gugick | G06F 11/1451 707/645 |
| 2001/0047461 | A1* | 11/2001 | Milillo | G06F 11/1448 711/162 |
| 2001/0047466 | A1* | 11/2001 | Topham | 712/226 |
| 2004/0215644 | A1* | 10/2004 | Edwards et al. | 707/100 |
| 2006/0123211 | A1* | 6/2006 | Derk | G06F 11/1451 711/162 |
| 2006/0218435 | A1* | 9/2006 | van Ingen et al. | 714/6 |
| 2007/0136541 | A1* | 6/2007 | Herz | G06F 11/1464 711/162 |
| 2008/0120459 | A1 | 5/2008 | Kaneda et al. | |
| 2009/0013129 | A1 | 1/2009 | Bondurant | |
| 2009/0024578 | A1* | 1/2009 | Wang et al. | 707/3 |
| 2009/0177855 | A1 | 7/2009 | Drews et al. | |
| 2009/0249005 | A1* | 10/2009 | Bender | G06F 11/1435 711/162 |
| 2010/0077161 | A1* | 3/2010 | Stoakes et al. | 711/162 |
| 2010/0082672 | A1 | 4/2010 | Kottomtharayil et al. | |
| 2010/0106691 | A1 | 4/2010 | Preslan et al. | |
| 2010/0174881 | A1 | 7/2010 | Anglin et al. | |
| 2010/0198792 | A1* | 8/2010 | Camble et al. | 707/645 |
| 2011/0010498 | A1* | 1/2011 | Lay et al. | 711/115 |
| 2011/0022718 | A1 | 1/2011 | Evans et al. | |
| 2011/0125720 | A1* | 5/2011 | Jayaraman | 707/692 |
| 2011/0218969 | A1* | 9/2011 | Anglin et al. | 707/679 |
| 2011/0225130 | A1* | 9/2011 | Tokoro | 707/692 |
| 2012/0078843 | A1* | 3/2012 | Mehrotra et al. | 707/640 |

FOREIGN PATENT DOCUMENTS

| | | |
|---|---|---|
| EP | 1975798 A1 | 10/2008 |
| EP | 2042979 A2 | 4/2009 |
| JP | 2008257716 A | 10/2008 |
| JP | 2008299441 A | 12/2008 |
| WO | 2009087028 A1 | 7/2009 |

OTHER PUBLICATIONS

"Best Practices for data deduplication technology in disk-based backup", Retrieved at << http://www.sencilo.com/blog/article/best-practices-for-data-deduplication-technology-in-disk-based-backup/ >>, Sencilo HealthIT Solutions, LLC, Sep. 9, 2009, pp. 3.
Randal, Paul S., "Filestream Storage in SQL Server 2008", Retrieved at << http://msdn.microsoft.com/en-us/library/cc949109%28SQL.100%29.aspx >>, copyright Microsoft Corporation, Oct. 2008, pp. 22.
"Introduction to Cisco WAAS", Retrieved at <<http://www.cisco.com/en/US/docs/app_ntwk_services/waas/waas/v407/configuration/guide/intro.html >>, Cisco Systems, Inc., Retrieved Date: Oct. 13, 2010, pp. 7.
Shastry, et al., "How to go hand-in-hand with DB2 and Informix", Retrieved at << http://www.ibm.com/developerworks/data/library/techarticle/dm-0701shastry/ >>, IBM Corporation, Jan. 25, 2007, pp. 31.
"International Search Report", dated Oct. 23, 2012, Application No. PCT/US2012/027636, Filed Date: Mar. 3, 2012, pp. 8.
European Search Report issued in European Patent Application No. 12757407.7, dated Mar. 5, 2015, 11 Pages.
First Office Action and Search Report Issued in Chinese Patent Application No. 201210062939.1, dated Nov. 30, 2015, 11 Pages.
Office Action Issued in Japanese Patent Application No. 2013-558039, dated Jan. 4, 2016, 8 Pages.
"Second Office Action Issued in Chinese Patent Application No. 201210062939.1", dated May 11, 2016, 7 Pages.
"Office Action Issued in Japanese Patent Application No. 2013-558039", dated Jul. 15, 2016, 4 Pages.
"Third Office Action Issues in Chinese Patent Application No. 201210062939.1", dated Nov. 28, 2016, 7 Pages.

* cited by examiner

1700

1702 — analyze the optimized stream metadata of each optimized data stream to determine a corresponding at least one data chunk identifier for the at least one data chunk referenced by the optimized stream metadata 1704 — store an optimized stream structure for each optimized data stream in the backup storage with the corresponding at least one data chunk identifier 1706 — store in the backup storage one or more chunk containers of the chunk store that contain the optimized data streams

1802 — select a backup technique based on heuristics

1804 — perform the backup technique to backup the plurality of optimized data streams in the backup storage

FIG. 18

BACKUP AND RESTORE STRATEGIES FOR DATA DEDUPLICATION

BACKGROUND

Data deduplication, also known as data optimization, is the act of reducing the physical amount of bytes of data which need to be stored on disk or transmitted across a network without compromising the fidelity or integrity of the original data. Data deduplication reduces the storage capacity needed to store data, and may therefore lead to savings in terms of storage hardware costs and data management costs. Data deduplication provides a solution to handling the rapid growth of digitally stored data.

Data deduplication may be performed according to one or more techniques to eliminate redundancy within and between persistently stored files. For instance, according to one technique, unique regions of data that appear multiple times in one or more files may be identified, and a single copy of those identified unique regions of data may be physically stored. References to those identified unique regions of data (also referred to as data "chunks") may be stored that indicate the files, and the locations in the files, that include them. This technique is commonly referred to as single instancing. Compression of data may be performed in addition to single instancing. Other data reduction techniques may also be implemented as part of a data deduplication solution.

Difficulties exist in managing data stored according to data deduplication techniques. For example, due to the data fragmentation imposed by data deduplication, latency may exist in accessing files stored according to deduplication. This latency limits the adoption of data deduplication solutions, especially on primary storage data, where users expect seamless, fast access to files. Furthermore, data deduplication algorithms may run on a dedicated appliance or on the device that stores and serves data (e.g., a file server). In the case of a file server, data deduplication may not be the primary function of the device, and thus data deduplication techniques may need to be efficient so as not to over consume device resources (e.g., memory, input/output (I/O) mechanisms, central processing unit (CPU) capacity, etc.). Still further, because the quantity of digital data is growing at a very high rate, the size of storage devices (e.g., storage disks) and the total storage capacity associated with computing devices is growing, causing difficulties with data deduplication techniques that do not scale well with increasing amounts of storage. Data deduplication does enable smaller data backups and more rapid data backups to be performed due to the compression of data, and resultantly enables faster restores of backed up data. However, challenges do exist in backing up deduplicated data and in restoring deduplicated data from backup storage.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for backing up optimized data streams to backup storage and for restoring data streams from backup storage. Optimized data in this specification refers to data that has been optimized, or deduplicated, by one or more of data deduplication techniques such as single-instancing of chunks and compression. Optimized streams refer to streams that were deduplicated, or in other words, their data was optimized using data deduplication techniques.

For instance, implementations for backup of optimized data streams are described. A chunk store includes a plurality of optimized data streams, with each optimized data stream having a plurality of chunks that includes at least one data chunk and optimized stream metadata (e.g., a stream map stored as a stream map chunk in a chunk container of the chunk store, a global table, a database, etc.) that maps identifiers for the data chunks to locations of the data chunks in the chunk store. The chunk store includes data chunks in a deduplicated manner. One or more of the optimized data streams stored in the chunk store may be identified for backup. To backup the identified optimized data streams, at least a portion of the chunk store is stored in backup storage. The chunk store (a portion thereof, or its entirety) is stored in the backup storage according to a selected backup technique.

For instance, according to an optimized backup technique, one or more chunk containers of the chunk store are stored in the backup storage in their entirety. A plurality of optimized stream structures is stored in the backup storage. The optimized stream structures are reparse points for the optimized data streams identified for backup.

According to an un-optimized backup technique, each optimized data stream identified for backup is rehydrated into a corresponding un-optimized data stream that includes any data chunks referenced by the metadata of the optimized data stream. Each un-optimized data stream is stored in the backup storage.

According to an item level backup technique, a first optimized data stream is identified for backup. One or more data chunks referenced by the metadata of the first optimized data stream that are not already stored in the backup storage are determined. The optimized stream metadata of the first optimized data stream is stored in the backup storage. The data chunks determined to not already be backed up are also stored in the backup storage. Each optimized data stream identified for backup may be stored in backup storage in a similar manner.

According to a data chunk identifier backup technique, the optimized stream metadata of each optimized data stream is analyzed to determine data chunk identifiers for the data chunks referenced by the optimized stream metadata. An optimized stream structure for each optimized data stream is stored in the backup storage with the corresponding at least one data chunk identifier. One or more chunk containers of the chunk store that store the referenced data chunks are also stored in the backup storage.

A backup technique may be selected based on heuristics. The selected backup technique is performed to backup the plurality of optimized data streams in the backup storage.

Implementations for the restore of optimized data streams from backup storage are also described. A request is received for an optimized data stream to be retrieved from a chunk store in backup storage. The request includes an identifier for optimized stream metadata corresponding to the data stream. A first call to a restore application is generated based on the optimized stream metadata identifier. The first call specifies a file name for a stream container in backup storage that stores the optimized stream metadata identified by the optimized stream metadata identifier, and specifies an offset for the optimized stream metadata in the stream container. The optimized stream metadata is received in response to the first call. At least one data chunk identifier referenced in the optimized stream metadata is identified. At least one additional call to the restore application is generated corresponding to the data chunk identifier(s) referenced by the optimized stream metadata to obtain at least one data chunk from at least one chunk container in backup storage. The data chunk(s) is/are received in response to the additional call(s). The data chunk(s) are combinable to restore the data stream.

In one implementation, the data chunk identifiers referenced by optimized stream metadata may be sorted based on chunk container as a first sort key and chunk offset as a second key. The calls to the restore application to retrieve data chunks may be generated in an order defined by the sorting.

In one implementation, a restore engine may call the restore application with a restore plan, which may include a request to determine the order of the restore by sorting the backup files containing data chunks, or to inform the restore application of which files extents are about to be restored, such that the restore application can optimize by performing caching and read-ahead operations.

Implementations of systems for backup and/or restore of optimized data streams are described. In one implementation, a data backup module receives an identification of a plurality of optimized data streams stored in a chunk store to be backed up. The data backup module is configured to store at least a portion of the chunk store in a backup storage to backup the plurality of optimized data streams.

In implementations, the data backup module may include one or more of an optimized file backup module, a rehydrating backup module, an item level backup module, and/or a data chunk identifier backup module. The optimized file backup module is configured to store the chunk store in its entirety in the backup storage as well as optimized data structures as reparse points for the optimized data streams. The rehydrating backup module is configured to rehydrate each optimized data stream into a corresponding un-optimized data stream that includes any data chunks referenced by the optimized stream metadata. The rehydrating backup module stores each un-optimized data stream in the backup storage. The item level backup module is configured for each optimized data stream to determine one or more data chunks referenced by metadata of the optimized stream metadata of the optimized data stream that are not already stored in the backup storage. The item level backup module stores the optimized stream metadata of the optimized data stream in the backup storage, and stores one or more data chunks determined not to be duplicates in the backup storage. The data chunk identifier backup module is configured to analyze the optimized stream metadata of each optimized data stream to determine at least one data chunk identifier for the data chunk(s) referenced by the optimized stream metadata. The data chunk identifier backup module stores each optimized data stream in the backup storage with the corresponding data chunk identifier(s), and stores one or more chunk containers of the chunk store in the backup storage.

In an implementation, the data backup module may include a heuristics module. The heuristics module is configured to select a backup technique based on heuristics, including heuristics such as the sizes of the data streams to be backed up, the sizes of the data streams after being deduplicated (to remove redundant data chunks), the overall size of the chunk store, and further heuristics, such as heuristics that may be generated based on these quantities. The heuristics module enables the backup technique to be performed to backup the plurality of optimized data streams in the backup storage.

In another implementation, a data restore module is configured to restore optimized data streams from backup storage. The data restore module includes a file reconstructor that receives a request for a data stream to be retrieved from a chunk store in the backup storage. The request includes an identifier for optimized stream metadata corresponding to the data stream. The file reconstructor includes a callback module (e.g., provided by a backup/restore system). The callback module generates a first call to a restore application based on the optimized stream metadata identifier. The first call specifies a file name for a first chunk container in the backup storage that stores optimized stream metadata identified by the optimized stream metadata identifier, and specifies an offset for the optimized stream metadata in the first chunk container. The file reconstructor receives the optimized stream metadata in response to the first call, and determines at least one data chunk identifier referenced in the optimized stream metadata. The callback module generates at least one additional call to the restore application corresponding to the data chunk identifier(s) to obtain one or more data chunks from one or more chunk containers in the backup storage. The file reconstructor receives the data chunk(s) in response to the additional call(s), and may combine the data chunk(s) to restore the data stream. Alternatively, the file constructor may store the optimized stream metadata and the data chunk(s) in a chunk store, and an optimized stream structure for the data stream may be stored in storage that references the chunks stored in the chunk store.

The callback module may also call the restore application with a restore plan, which may include a request to determine the order of the restore by sorting the data chunk container file list, or to inform the restore application of which extents are about to be restored from the container files, such that the restore application can optimize by performing caching and read-ahead operations.

Computer program products are also described herein for backing up optimized data streams to backup storage, for restoring optimized data streams from backup storage, and for further embodiments as described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 14-17 show flowcharts for performing various backup techniques for optimized data streams, according to example embodiments.

FIG. 18 shows a flowchart providing a process for selecting and executing a backup technique based on heuristics, according to an example embodiment.

Figure 1:
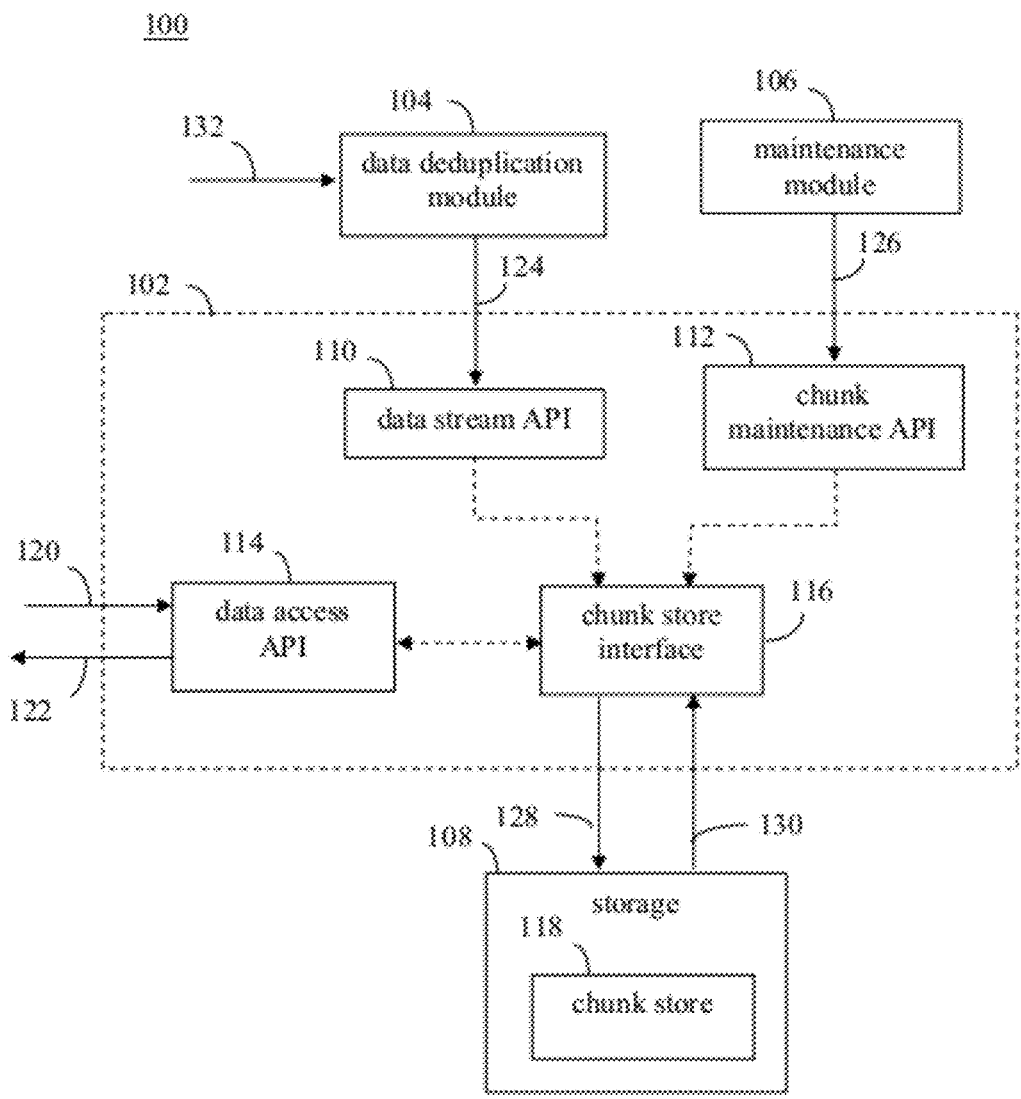
FIG. 1 shows a block diagram of a data deduplication system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Optimized data in this specification refers to data that has been optimized, or deduplicated, by one or more of data deduplication techniques such as single-instancing of chunks and compression. Optimized streams refer to streams that were deduplicated, or in other words, their data was optimized using data deduplication techniques.

II. Example Embodiments

Embodiments provide techniques for data deduplication. Such embodiments enable the amount of data (e.g., number of bytes) to be stored, or to be transmitted, to be reduced without compromising the fidelity or integrity of the data. For instance, embodiments enable reductions in the amount of latency in accessing optimized data. Furthermore, embodiments enable resources, such as computing machines/devices, to be used more efficiently, reducing resource consumption. Still further, embodiments provide techniques for data deduplication, for the backup of deduplicated data, and for the restoring of backed up data from storage that are scalable with the growth of the amount of digital data that is stored.

For instance, in an embodiment, a scalable chunk store is provided for data deduplication. The chunk store enables various techniques for minimizing latency in optimized data access, reducing machine resource consumption (e.g., memory and disk I/O), and enhancing reliability during data deduplication, backing up of data, and restoring of data. Example embodiments are described in further detail in the following subsections.

A. Example Data Deduplication Embodiments

In embodiments, data to be stored may be optimized to reduce an amount of storage needed for the data. For instance, data streams may be stored in the form of unique data chunks. The data chunks may be referenced by optimized stream metadata that defines the data streams. In this manner, the data streams are stored more efficiently, because metadata for multiple data streams may reference the same stored data chunk, rather than the same data chunk being stored multiple times. Furthermore, the optimized data may be requested (e.g., by applications) from storage as desired. In such case, the data streams may be reassembled from the stored data chunks according to the corresponding metadata.

For instance, FIG. 1 shows a block diagram of a data deduplication system 100, according to an example embodiment. As shown in FIG. 1, system 100 includes a storage system 102, a data deduplication module 104, a maintenance module 106, and storage 108. Furthermore, storage system 102 includes a data stream API (application programming interface) 110, a chunk maintenance API 112, and a data access API 114. System 100 is described as follows to illustrate the storage of optimized data, and the recovery of optimized data from storage, and is not intended to be limiting.

System 100 is configured to enable data to be stored in storage 108 in an efficient manner, and for data to be retrieved from storage 108. For example, in an embodiment, data deduplication module 104 may be present. Data deduplication module 104 is configured to optimize received data for storage. For instance, data deduplication module 104 may compress received data received as a data stream 132. Data stream 132 may include a portion of a data file, a single data file, multiple data files, and/or any combination of files and/or file portions. As shown in FIG. 1, data deduplication module 104 generates data chunks 124, which may be a compressed and segmented version of data stream 132.

Data stream API 110 provides an interface for storage system 102 to receive data chunks 124. Data chunks 124 may include a plurality of data chunks that form data stream 132 from which data chunks 124 are generated. Data stream API 110 may be configured in any suitable manner, as would be known to persons skilled in the relevant art(s). Data stream API 110 may output data chunks 124 to be received by chunk store interface 116.

As shown in FIG. 1, storage 108 is coupled to storage system 102. Chunk store interface 116 is an interface between APIs 110, 112, and 114 and storage 108. For example, chunk store interface 116 may receive data chunks 124, and may store the data chunks of data chunks 124 in storage 108. For example, as shown in FIG. 1, storage 108 includes a chunk store 118. Chunk store interface 116 may store the received data chunks of data chunks 124 in chunk store 118 as data chunks 128.

Data access API 114 provides an interface for applications to request data of storage system 102. For instance, as shown in FIG. 1, data access API 114 may receive a data stream request 120. Data access API 114 may be configured in any suitable manner, as would be known to persons skilled in the relevant art(s). Data access API 114 may output data stream request 120 to be received by chunk store interface 116. Chunk store interface 116 may request the data chunks from storage 108 (e.g., from chunk store 118) that correspond to the requested data stream of data stream request 120. Chunk store interface 116 may receive the requested data chunks from storage 108 as data chunks 130, and may provide a data stream that includes data chunks 130 to data access API 114. Data access API 114 may provide the data stream (e.g., one or re-assembled files) to the requesting application as data stream response 122.

Furthermore, maintenance module 106 may be present to perform one or more types of maintenance jobs with respect to data chunks stored in chunk store 118. For example, maintenance module 106 may include a defragmentation module to perform defragmentation of data chunks stored in storage 108. For instance, the defragmentation module may be configured to eliminate empty spaces in storage 108 (e.g., perform compaction), to move related data chunks into a sequence, and/or to perform other related tasks. In another example, maintenance module 106 may include a garbage collection module to perform garbage collection of data chunks stored in storage 108. For instance, the garbage collection module may be configured to delete unused data chunks in storage 108. In further embodiments, maintenance module 106 may perform additional or alternative maintenance tasks with respect to storage 108.

As shown in FIG. 1, chunk maintenance API 112 provides an interface for maintenance module 106 to interact with storage system 102. Maintenance module 106 may generate a maintenance task 126 (e.g., a defragmentation instruction, a compaction instruction, a data chunk deletion instruction, etc.) that is received by chunk maintenance API 112. Chunk maintenance API 112 may be configured in any suitable manner, as would be known to persons skilled in the relevant art(s). Chunk maintenance API 112 may provide maintenance task 126 to chunk store interface 116. Chunk store interface 116 may enable maintenance task 126 to be performed on data chunks stored in storage 108.

Storage system 102 may be implemented in any suitable form, including the form of one or more computers/computing devices, etc. Storage 108 may include one or more of any type of storage mechanism, including a magnetic disc (e.g., in a hard disk drive), an optical disc (e.g., in an optical disk drive), a magnetic tape (e.g., in a tape drive), and/or any other suitable type of storage medium.

Note that data deduplication system 100 is example of an environment in which embodiments of the present invention may be implemented. Data deduplication system 100 is provided for purposes of illustration, and is not intended to be limiting. Embodiments may be incorporated in further types and configurations of data deduplication systems.

B. Example Chunk Store Embodiments that Enable Data Chunk Locality

Chunk store 118 of FIG. 1 may store data streams in the form of data chunks in any manner. For instance, chunk store 118 may store optimized stream metadata in the form of maps, databases, or other forms, that indicate the data chunks included in the data streams. Chunk store 118 may further store the referenced data chunks. In an embodiment, chunk store 118 does not store duplicate copies of data chunks, according to data deduplication techniques.

Figure 2:
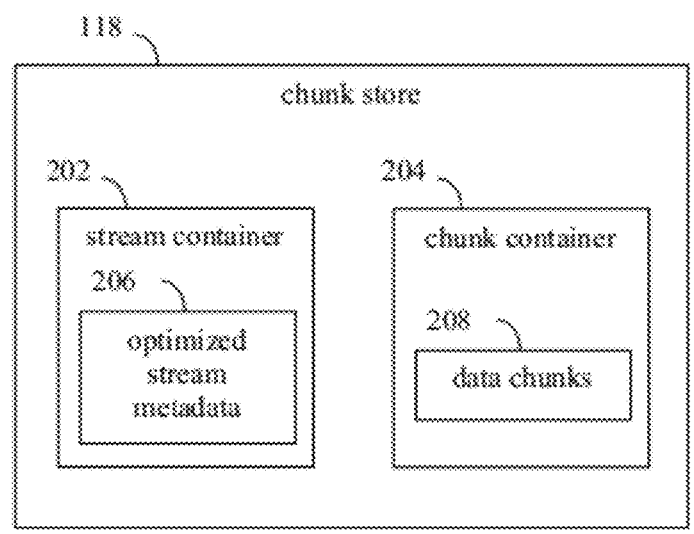
FIG. 2 shows a block diagram of a chunk store, according to an example embodiment.

For instance, FIG. 2 shows a block diagram of chunk store 118, according to an example embodiment. As shown in FIG. 2, chunk store 118 includes a stream container 202 and a chunk container 204. Stream container 202 includes optimized stream metadata 206 for one or more data streams, and chunk container 204 includes a plurality of data chunks 208. A data chunk 208 is a segment of data that is referenced by one or more data streams (e.g., data stream 132 of FIG. 1). Optimized stream metadata 206 is a data structure that describes the mapping between the original data stream structure and the optimized data chunk structure. Optimized stream metadata 206 contains data chunk location information, either directly or through an indirection layer, such that the referenced data chunks can be located and assembled into a file stream view. Optimized stream metadata 206 may have various forms in embodiments, including having the form of stream maps (each stream map indicating data chunk locations for a corresponding data stream), a database or global table (that indicates data chunk locations for all data streams), or other form. In the example of FIG. 2, data chunks 208 and optimized stream metadata 206 are stored in stream container 202 and chunk container 204, respectively, which may be files in a file system. In an embodiment, chunk store 118 may store all data in the form of chunks, such that optimized stream metadata 206 is stored as data chunks (e.g., each stream map is stored is a data chunk) that contain internal metadata (data stream metadata) to describe the file stream-to-data chunk 208 mapping, data chunk addresses, and hashes. Alternatively, optimized stream metadata 206 may be stored in other forms (e.g., a central database or table, etc.).

Figure 3:
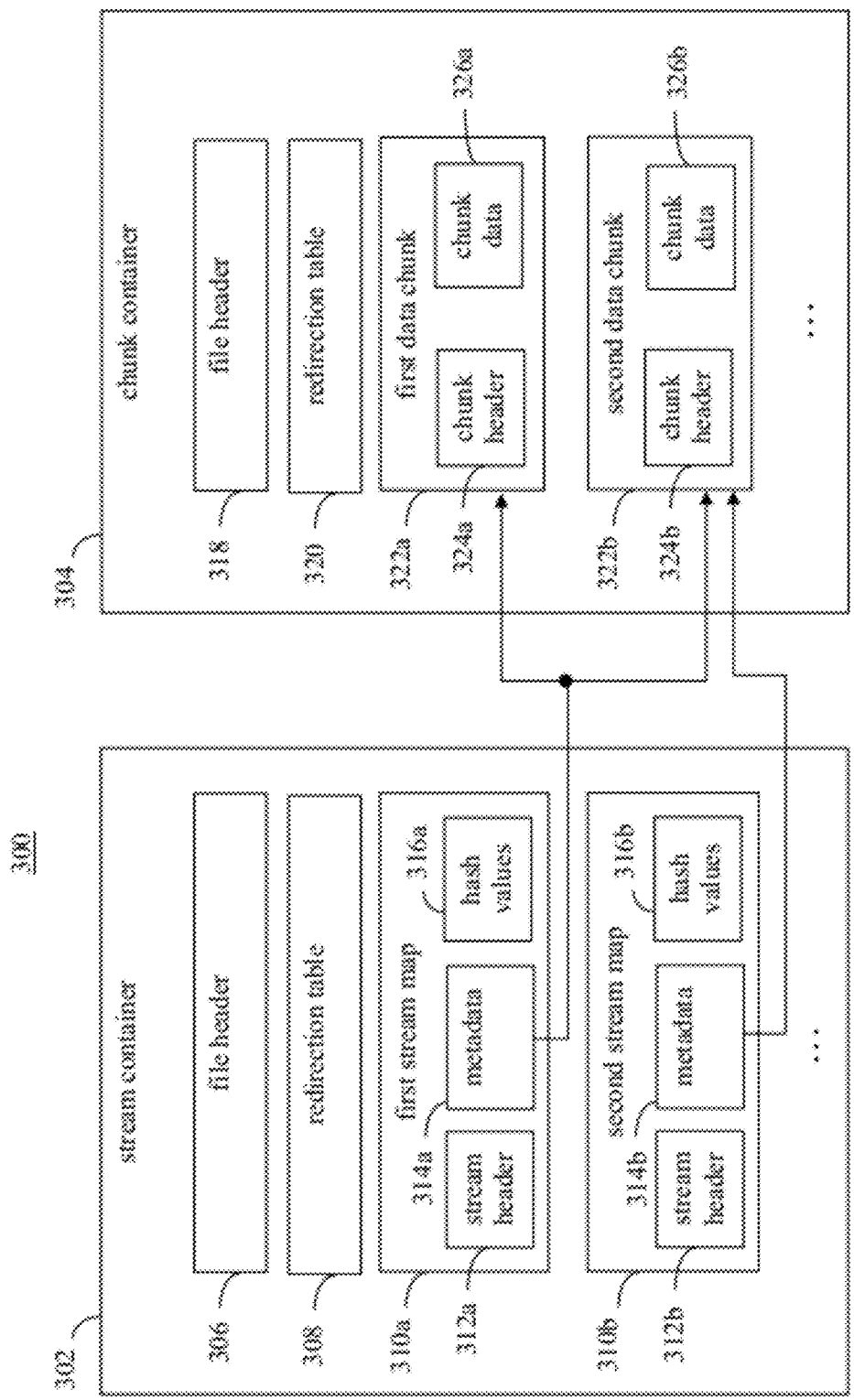
FIG. 3 shows a block diagram of a chunk store, according to an example embodiment.

Stream container 202 and chunk container 204 may be configured in various ways, in embodiments. For instance, FIG. 3 shows a block diagram of a chunk store 300, according to an example embodiment. Chunk store 300 is an example of chunk store 118 of FIG. 2. As shown in FIG. 3, chunk store 300 includes a storage container 302 and a chunk container 304. Storage container 302 is an example of storage container 202 of FIG. 2, and chunk container 304 is an example of chunk container 204 of FIG. 2. In the embodiment of FIG. 3, storage container 302 includes a file header 306, a redirection table 308, and a plurality of stream maps 310. Stream maps 310 are examples of optimized stream metadata 206 that are provided for ease of illustration. For purposes of illustration, optimized stream metadata 206 may frequently be described herein in terms of stream maps, but it is intended to be understood that in other embodiments, optimized stream metadata 206 may be alternatively stored as a database, a global table, etc.

First and second stream maps 310a and 310b are shown in FIG. 3 for purposes of illustration, but in embodiments, any number of stream maps 310 may be included in stream container 302, including hundreds, thousands, and even greater numbers of stream maps 310. Chunk container 304 includes a file header 318, a redirection table 320, and a plurality of data chunks 322. First and second data chunks 322a and 322b are shown in FIG. 3 for purposes of illustration, but in embodiments, any number of data chunks 322 may be included in chunk container 304, including hundreds, thousands, and even greater numbers of data chunks 322. These features of FIG. 3 are described as follows.

File header 306 is a file header for stream container 302 in an embodiment where stream container 302 is stored as a file. File header 306 may include information associated with stream container 302, including a stream container identifier (e.g., a stream container identification number), etc.

Redirection table 308 is optionally present in stream container 302. When present, redirection table 308 may store information regarding changes in location in stream container 302 of any of stream maps 310. For example, first stream map 310a may be deleted from stream container 302, and second stream map 310b may be moved to the location of first stream map 310a (e.g., due to a defragmentation or compaction routine). Subsequent to the move, stream container 302 may be accessed by an application to retrieve second stream map 310b. However, the application may still be using the prior location of second stream map 310b. Redirection table 308 may include a mapping for second stream map 310b that indicates the current location of second stream map 310b. As such, the application may access redirection table 308 to determine the current location of second stream map 310b, and may thereby be enabled to retrieve second stream map 310b from its new location.

Stream maps 310 are examples of optimized stream metadata 206 of FIG. 2. Each of stream maps 310 is used to define the sequences of data chunks 322 that make up a particular data stream. As shown in FIG. 3, each of stream maps 310 may include a stream header 312, metadata 314, and hash values 316. For instance, first stream map 310a is shown including stream header 312a, metadata 314a, and hash values 316a, and second stream map 310b is shown including stream header 312b, metadata 314b, and hash values 316b. Each stream header 312 includes information associated with the corresponding stream map 310, such as a stream map identifier (e.g., a stream map identification number), etc. Each metadata 314 includes information describing the data chunks 322 that make up the data stream defined by the corresponding stream map 310. Hash values 316 are optionally present. Hash values 316 are hash values for the data chunks 322 that make up the data stream defined by the corresponding stream map 310. Hash values 316 may be stored in stream maps 310 in order to provide efficient access to a hash vector of the data chunks that make up the corresponding data stream. For instance, this may be useful for wire data transfer scenarios where fast access to full list of data stream hashes (hashes for all the optimized file chunks) is desired.

Metadata 314 is per-data chunk metadata, or data chunk specific metadata, that may be included in stream map 310 for each referenced data chunk 322. Various types of information may be included in metadata 314. For instance, in one embodiment, metadata 314 for a data chunk 322 may include one or more of a data stream offset, a data chunk identifier, and a locality indicator. The data stream offset indicates a location for the associated data chunk 322 in the data stream defined by the particular stream map 310 (e.g., a number of bytes from the beginning of the data stream, or from other reference point in the data stream, at which the associated data chunk 322 begins). The data chunk identifier, also known as a chunk id or "reliable chunk locator," is a reference or pointer to the corresponding data chunk 322 in chunk container 304. The locality indicator is information that represents a chunk insertion order in chunk container 304, enabling a determination to be made of which data chunks 322 may be referenced by a common stream map 310. In other embodiments, metadata 314 may include additional and/or alternative information for each referenced data chunk 322.

With reference to chunk container 304 of FIG. 3, file header 318 is a file header for chunk container 302 in an embodiment where chunk container 304 is stored as a file. File header 318 may include information associated with chunk container 304, including a chunk container identifier (e.g., a chunk container identification number), a chunk container generation indicator that indicates a revision number of chunk container 304, etc.

Redirection table 320 is optionally present in chunk container 304. When present, redirection table 320 may store information regarding changes in location in chunk container 304 of any of data chunks 322, in a similar manner as how redirection table 308 of stream container 302 handles changes in location of stream maps 310.

Data chunks 322 are examples of data chunks 208 of FIG. 2. As shown in FIG. 3, each of data chunks 322 includes a chunk header 324 and chunk data 326. For instance, first data chunk 322a includes chunk header 324a and chunk data 326a, and second data chunk 322b includes chunk header 324b and chunk data 326b. Each chunk header 312 includes information associated with the corresponding data chunk 322, such as a data chunk identifier, etc. Each chunk data 326 includes the corresponding data, which may be in compressed or non-compressed form.

Stream maps 310 and data chunks 322 are stored in stream container 302 and chunk container 304, respectively, to enable data deduplication. For instance, chunk store interface 116 of FIG. 1 may receive data chunks 124 associated with data streams 132, and may store the data chunks in chunk store 300 of FIG. 3. For instance, for a particular data stream 132, chunk store interface 116 may generate a stream map that is stored in stream container 302 as a stream map 310 that references one or more data chunks 322 stored in chunk container 304 by chunk store interface 116.

For instance, FIG. 3 indicates some data chunks 322 that are referenced by stream maps 310, according to an example embodiment. As shown in FIG. 3, first stream map 310a includes metadata 314a that includes references to first and second data chunks 322a and 322b in chunk container 304. Thus, first and second data chunks 322a and 322b are included in the source data stream associated with first stream map 310a. For example, metadata 314a may include a data stream offset 402 value for first data chunk 322a that indicates a location of first data chunk 322a in the source data stream defined by first stream map 310a, a data chunk identifier 404 for first data chunk 322a in chunk container 304 (e.g., the data chunk identifier for first data chunk 322a stored in chunk header 324a), and a locality indicator 406 for first data chunk 322a. Furthermore, metadata 314a may include a data stream offset 402 value for second data chunk 322b that indicates a location of second data chunk 322b in the source data stream, a data chunk identifier 404 for second data chunk 322b in chunk container 304 (e.g., the data chunk identifier for second data chunk 322b stored in chunk header 324b), and a locality indicator 406 for second data chunk 322b. In an embodiment, first and second data chunks 322a and 322b may have a same value for their locality indicators that is generated to correspond to the source data stream defined by first stream map 310a, and that indicates that first and second data chunks 322a and 322b are contiguously (adjacently) stored in chunk container 304.

Furthermore, second stream map 310b includes metadata 314b that includes references to second data chunk 322b in chunk container 304. For example, metadata 314b may include a data stream offset 402 value for second data chunk 322b that indicates a location of second data chunk 322b in the source data stream defined by second stream map 310b, a data chunk identifier 404 for second data chunk 322b in chunk container 304 (e.g., the data chunk identifier for second data chunk 322b stored in chunk header 324b), and a locality indicator 406 for second data chunk 322b. The locality indicator 406 in metadata 314b for second data chunk 322b has the same value as the locality indicators generated for first and second data chunks 322a and 322b because second data chunk 322b was originally stored in chunk container 304 for first stream map 310a. Any further data chunks 322 (not shown in FIG. 3) that were newly stored in chunk container 304 when the source data stream defined by second stream map 310b was stored in chunk store 300 are assigned a new value for locality indicator 406.

Figure 4:
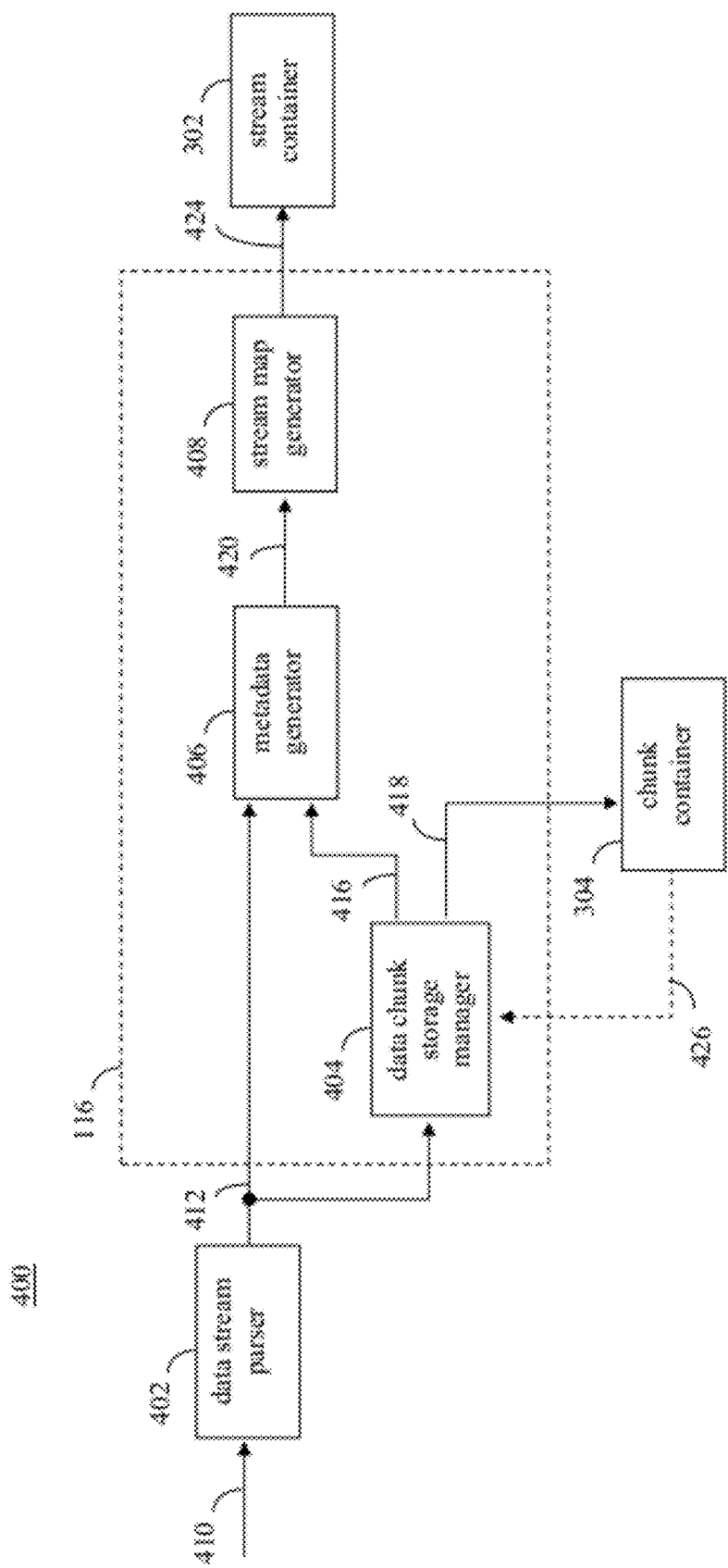
FIG. 4 shows a block diagram of a data stream store system, according to example embodiment.
Figure 5:
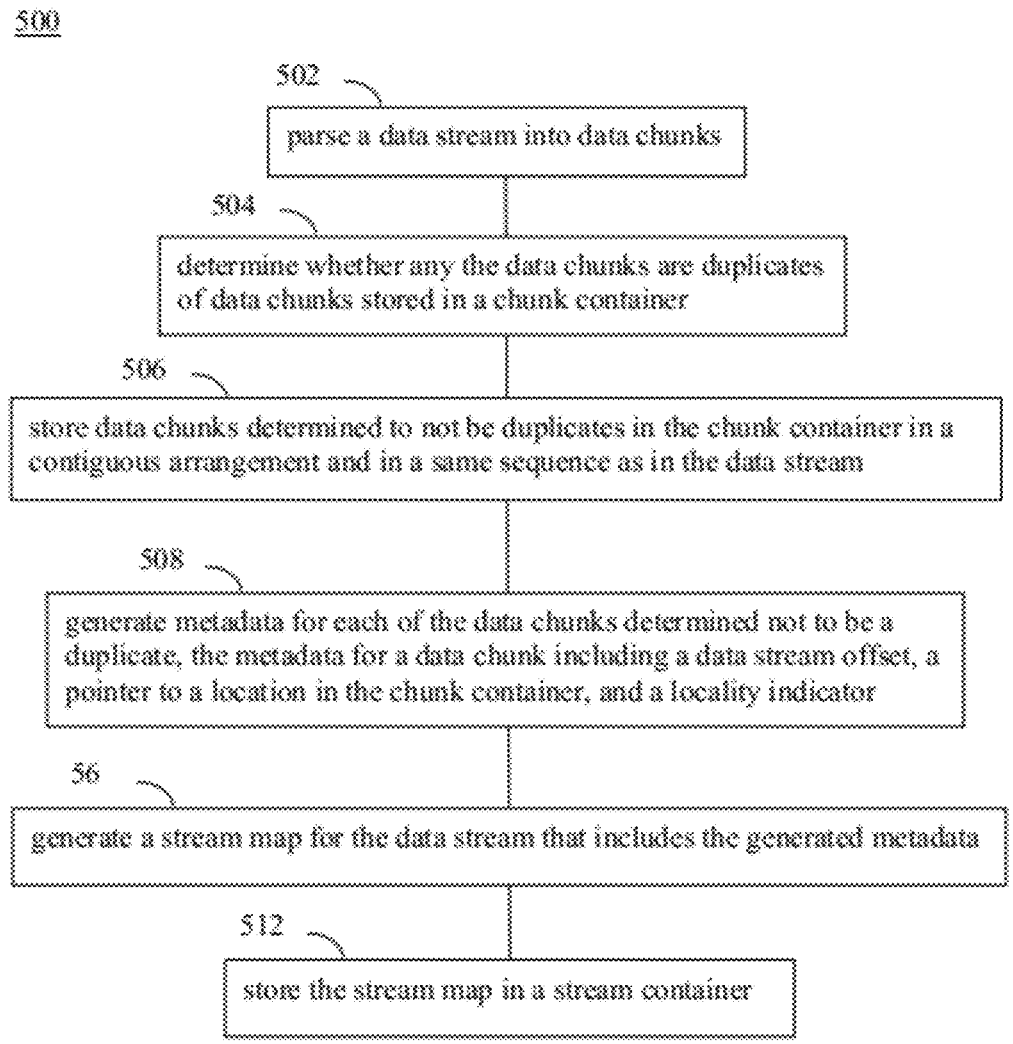
FIG. 5 shows a flowchart for storing a data stream, according to an example embodiment.

Chunk store interface 116 of FIG. 1 may be configured in various ways to store data streams in chunk store 300 of FIG. 3. For instance, FIG. 4 shows a block diagram of data stream store system 400, according to example embodiment. As shown in FIG. 4, data stream store system 400 includes a data stream parser 402, chunk store interface 116, stream container 302, and chunk container 304. In an embodiment, data stream parser 402 may be included in data deduplication module 104 of FIG. 1. In the embodiment of FIG. 4, chunk store interface 116 includes a data chunk storage manager 404, a metadata generator 406, and a stream map generator 408. These features of FIG. 4 are described as follows with respect to FIG. 5. FIG. 5 shows a flowchart 500 for storing a data stream, according to an example embodiment. In an embodiment, system 400 of FIG. 4 may operate according to flowchart 500. Further structural and operational embodiments will be apparent to persons skilled in the relevant art(s) based on the discussion regarding flowchart 500. Flowchart 500 and system 400 are described as follows.

Flowchart 500 begins with step 502. In step 502, a data stream is parsed into data chunks. For example, as shown in FIG. 4, data stream parser 402 may receive a data stream 410. Data stream 410 may include one or more files and/or portions of files, similarly to data stream 132 of FIG. 1. Data stream parser 402 is configured to parse data stream 410 into a sequence of data chunks, indicated as data chunk sequence 412. For instance, in an embodiment, data chunk sequence 412 may include the sequence of data chunks in the order the data chunks are located in data stream 410. The data chunks of data chunk sequence 412 may have the same size or may have different sizes.

In step 504, whether any of the data chunks are duplicates of data chunks stored in a chunk container is determined. For example, as shown in FIG. 4, data chunk storage manager 404 receives data chunk sequence 412. Data chunk storage manager 404 is configured to determine whether any of the data chunks of data chunk sequence 412 are already stored in chunk container 304, and therefore are duplicates. For example, in an embodiment, as shown in FIG. 4, data chunk storage manager 404 may receive data chunk information 426 from chunk container 304, which may include hash values for each data chunk 322 stored in chunk container 304. In another embodiment, data chunk storage manager 404 may receive hash values 316 (FIG. 3) from stream container 302, which are hash values for data chunks 322 stored in chunk container 304. Data chunk storage manager 404 may generate a hash value for each data chunk of data chunk sequence 412, and may compare the generated hash values to the hash values received in data chunk information 426 (or from stream container 302) to determine which data chunks of data chunk sequence 412 are already stored in chunk container 304. In further embodiments, data chunk storage manager 404 may determine which data chunks of data chunk sequence 412 are already stored in chunk container 304 in other ways, as would be known to persons skilled in the relevant art(s).

As shown in FIG. 4, data chunk storage manager 404 generates a stored chunk indication 416, which indicates which data chunks of data chunk sequence 412 are already stored in chunk container 304.

Referring back to FIG. 5, in step 506, data chunks determined to not be duplicates are stored in the chunk container in a contiguous arrangement and in a same sequence as in the data stream. For example, in an embodiment, data chunk storage manager 404 may be configured to store the data chunks of data chunk sequence 412 that were not determined to be stored in chunk container 304. For example, in an embodiment, data chunk storage manager 404 may generate a chunk header 324 (e.g., a data chunk identifier) for each new data chunk, and store each new data chunk as a data chunk 322 with chunk header 324 and chunk data 326. Furthermore, in an embodiment, data chunk storage manager 404 is configured to store the new data chunks in a contiguous arrangement in chunk container 304, in a same order as in the source data stream (e.g., in the order received in data chunk sequence 412).

In step 508, metadata is generated for each of the data chunks determined not to be a duplicate, the metadata for a data chunk including a data stream offset, a pointer to a location in the chunk container, and a locality indicator. For example, as shown in FIG. 4, metadata generator 406 may receive data chunk sequence 412 and stored chunk indication 416. In an embodiment, metadata generator 406 may be configured to generate metadata (e.g., metadata 314 of FIG. 3). Metadata generator 406 may generate metadata for each data chunk of data chunk sequence 412, including data stream offset 402, data chunk identifier 404, and locality indicator 406. For data chunks determined to already be stored in chunk container 304 (in step 504), data chunk identifier 404 is configured to point at the already stored data chunk. For data chunks newly stored in chunk container 304 in step 508, data chunk identifier 404 is configured to point at the newly stored data chunk.

Referring back to FIG. 5, in step 510, a stream map is generated for the data stream that includes the generated metadata. For example, as shown in FIG. 4, stream map generator 408, receives data chunk metadata 420 for each data chunk received in data chunk sequence 412 for a particular data stream. Stream map generator 408 generates a stream map 424 associated with the data stream that includes data chunk metadata 420 for each received data chunk. Furthermore, stream map generator 408 may generate a stream header 312 for stream map 424, and may include hash values 316 for each received data chunk in stream map 424.

In step 512, the stream map is stored in a stream container. For instance, as shown in FIG. 4, stream map generator 408 may store (or "persist") stream map 424 in stream container 302 (e.g., as a stream map 310). Note that in an alternative embodiment, rather than generating and storing a stream map for a data stream, an entry may be made in a database or global table for the data stream that includes metadata pointing to or indicating a location of the data chunks referenced by the data stream.

Figure 6:
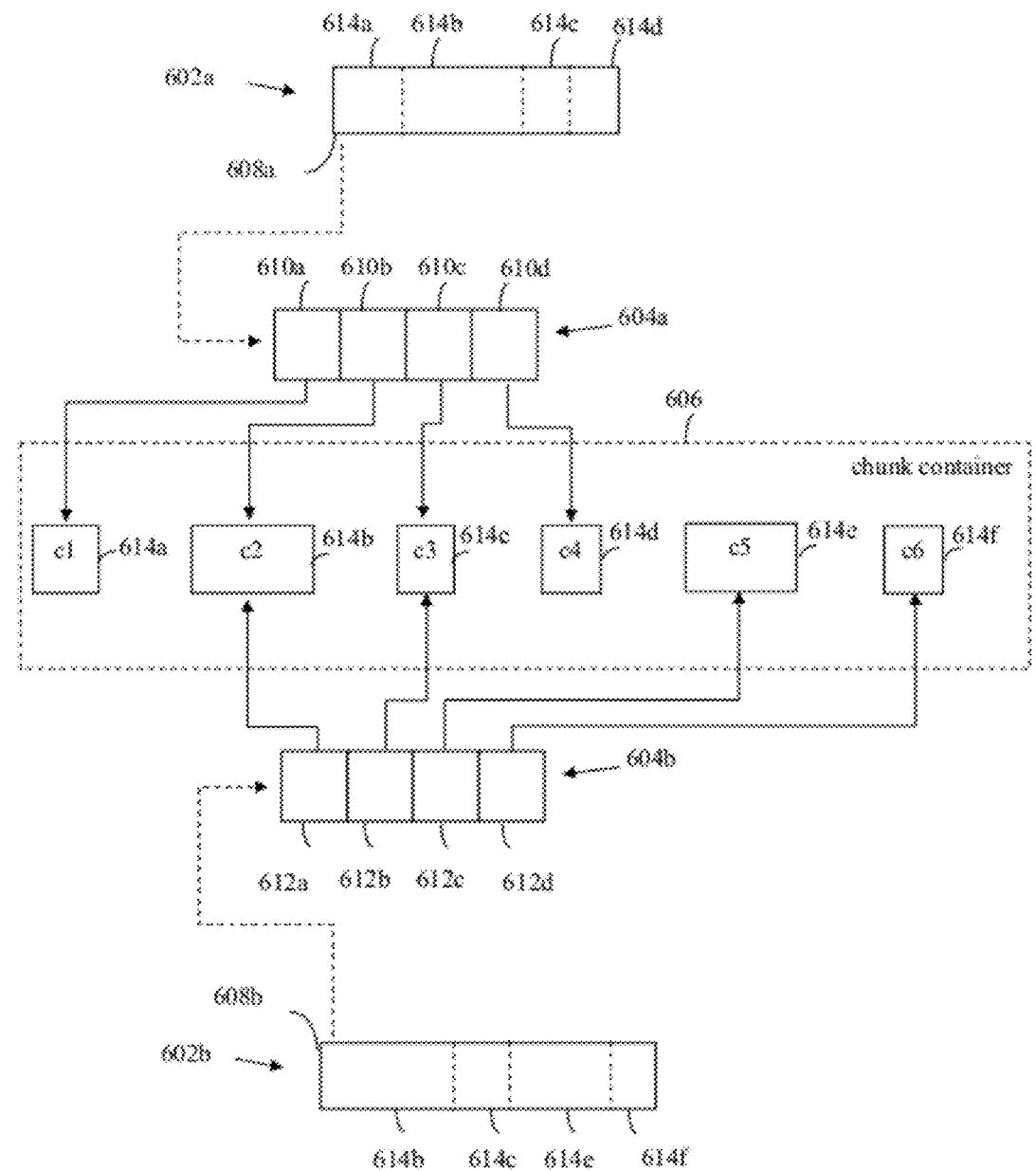
FIG. 6 shows a block diagram that illustrates an example of the storing of data streams in a data store, according to an embodiment.

FIG. 6 shows a block diagram that illustrates an example of the storing of data streams in a data store, according to an embodiment. FIG. 6 is provided for purposes of illustration, and is not intended to be limiting. In the example of FIG. 6, a first data stream 602a is stored in a data store, followed by a second data stream 602b being stored in the data store. A stream link 608a (also known as "stream pointer" or "stream metadata stub") is shown for first data stream 602a, and a stream link 608b is shown for second data stream 602b. Each stream link 608 links a data stream 602 to the corresponding data (e.g., stream map 604 or other optimized stream metadata) in the chunk store that enables the data stream 602 to be reassembled. As shown in FIG. 6, first data stream 602a includes four data chunks 614a-614d. A stream map 604a may be generated for first data stream 602a, and the four data chunks 614a-614d may be stored in a chunk container 606, as described above. Stream map 604a includes pointers (represented by arrows in FIG. 6) to each of data chunks 614a-614d. Data chunks 614a-614d may be categorized in a single set of all new, unique data chunks to chunk container 606. As such, data chunks 614a-614d may be stored in chunk container 606 in a contiguous arrangement, in a same order as in data stream 602a. For example, data chunks 614a-614d may be the first four data chunks stored in chunk container 606, or if one or more data chunks are already stored in chunk container 606, data chunks 614a-614d may be stored in chunk container 606 immediately after the already stored data chunks. Each of data chunks 614a-614d is assigned the same locality indicator value in stream map 604a, the locality indicator value selected for first data stream 602a.

Second data stream 602b includes four data chunks 614b, 614c, 614e, and 614f. A stream map 604b may be generated for second data stream 602b. Data chunks 614b, 614c, 614e, and 614f may be categorized into two sets of data chunks according to step 504 of flowchart 500: a first set that includes chunks 614b and 614c, which already have copies residing in chunk container 606 (due to the chunk sequence of first data stream 602a), and a second set that includes chunks 614e and 614f, which are new, unique data chunks (that do not have copies already stored in chunk container 606). Because data chunks 614b and 614c are already stored in chunk container 606, stream map 604b includes pointers (values for data chunk identifier 404) to data chunks 614b and 614c already stored in chunk container 606. Thus, data chunks 614b and 614c may be stored as pointers to existing data chunks in chunk container 606 without storing chunk data of data chunks 614b and 614c. Because data chunks 614e and 614f are not already stored in chunk container 606, data chunks 614e and 614f may be stored in chunk container 606, as described above. For instance, because data chunks 614e and 614f are new, unique data chunks to chunk container 606, chunks 614e and 614f may be stored in chunk container 606 in a contiguous arrangement, in a same order as in data stream 602b, after the last stored data chunk currently stored in chunk container 606 (e.g., data chunk 614d). Stream map 604b includes first-fourth data chunk identifiers 612a-612d, which point to data chunks 614b, 614c, 614e, and 614f stored in chunk container 606, respectively. In stream map 604b, data chunks 614b and 614c are assigned the locality indicator value associated with first data stream 602a, and data chunks 614e and 614f are assigned the locality indicator value selected for second data stream 602b.

Note that any number of additional data streams 602 may be stored in a similar manner following data streams 602a and 602b. Furthermore, note that in the example of FIG. 6, data chunks of second stream map 604b were each assigned one of two locality indicator values—either the new locality indicator value selected for second stream map 604b, or the locality indicator value associated with the data chunks of first stream map 604a. In embodiments, data chunks of a particular stream map may be assigned one of any number of locality indicator values, depending on the number of different locality indicators associated with data chunks of the stream map that are already present in the chunk container. For instance, as described above, new data chunks to a chunk container may be assigned the new locality indicator value selected for the particular data stream associated with the stream map. Furthermore, any number of data chunks referenced by the stream map that are already present in the chunk container are assigned the corresponding locality indicator values of the data chunks already present in the chunk container. This may mean that any number of one or more sets of data chunks of the data stream may be assigned corresponding locality indicator values, such that data chunks of the data stream may be assigned locality indicators selected from two, three, or even more different locality indicator values.

As such, locality indicators of stream map metadata enable the locality of data chunks in data streams to be ascertained. This is because duplicate data chunks tend to occur in groups. When a new data stream contains an already known data chunk (already stored in the chunk container), there is a reasonable probability that the next data chunk in the new data stream is also a duplicate data chunk (already stored in the chunk container). Because new, original data chunks are stored in the chunk container adjacent to one another according to the locality indicator, the already present data chunks that the new data stream references are more likely to also be contiguously stored in the chunk container. This aids in improving the performance of reading optimized data streams from a chunk store. For instance, a rehydration module configured to re-assemble a data stream based on the corresponding stream map and data chunks can perform a read-ahead on the data chunks stored in the chunk container, expecting to find the next data chunk needs in the read-ahead buffer. Furthermore, chunk store maintenance tasks like defragmentation and compaction can perform their tasks while attempting to maintain the original locality by keeping the existing adjacent chunks together as they are move around the chunk container.

Figure 7:
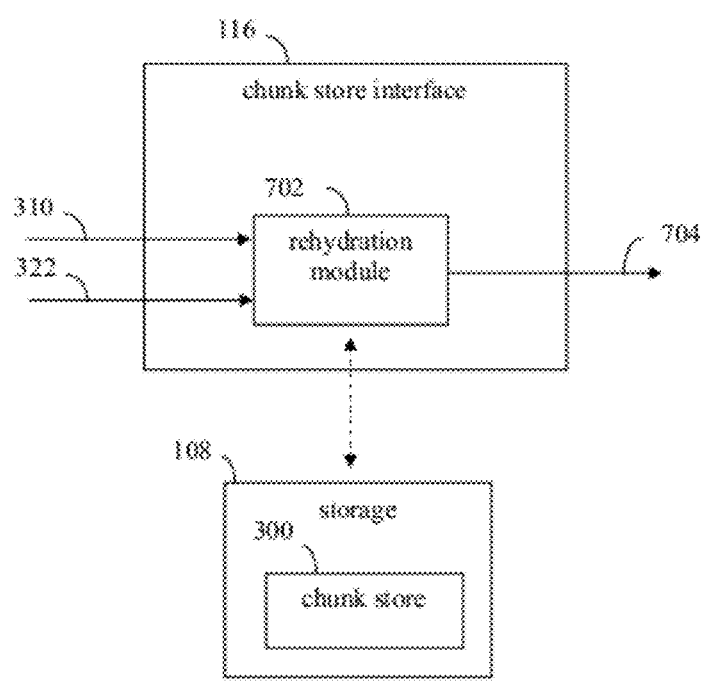
FIG. 7 shows a block diagram of a chunk store interface that includes a rehydration module, according to an example embodiment.

For instance, after data streams are optimized and stored in chunk store 300 in the form of stream maps 310 and data chunks 322, the data streams may be read from chunk store 300. FIG. 7 shows a block diagram of chunk store interface 116 including a rehydration module 702, according to an example embodiment. Rehydration module 702 is configured to re-assemble a requested data stream (e.g., requested according to data stream request 120 shown in FIG. 1). For instance, for a data stream to be read from chunk store 300 in response to a data stream request 120 (FIG. 1), rehydration module 702 determines and receives the stream map 310 referenced by the optimized file of the data stream request 120 from chunk store 300 (e.g., at the reparse location). For instance, rehydration module 702 may provide a stream map identifier of request 120 to chunk store 300 of FIG. 3. Chunk store 300 retrieves the corresponding stream map 310 based on the stream map identifier (e.g., by scanning stream map headers 312), and rehydration module 702 may regenerate or "rehydrate" the data stream according to the retrieved stream map 310. The retrieved stream map 310 includes pointers (data chunk identifier 404 of FIG. 4) to each of the data chunks in chunk container 304 included in the data stream. Rehydration module 702 uses the pointers to retrieve each of the data chunks 322. Rehydration module 702 may use data stream offsets 402 included in the retrieved stream map 310 (e.g., plus data chunk length information that may be included in the retrieved stream map 310) to arrange the retrieved data chunks 322 in the proper order to re-generate the data stream, which is output by rehydration module 702 as data stream 704.

Through the use of locality indicators 406, sequential reads of data chunks 322 from chunk container 304 may be performed. For instance, when a file stream is being accessed in chunk store 300 by rehydration module 702 using sequential I/O (input/output) requests, or any I/O requests that encompass more than one data chunk boundary, stream map 310 enables fast access to data chunks. This is because at the time that chunk store 300 creates stream maps 310, new data chunks are stored in chunk container 304 contiguously in stream-map order. As such, during a sequential data access by rehydration module 702, data chunks belonging to the same data stream are likely to be stored contiguously, such contiguous data chunks may be accessed and read with a single data access "seek" (e.g., movements forward or backward through a chunk container to find a next stored data chunk to read), and fragmentation is reduced to non-unique data chunks (the data chunks referenced by a stream map that were already present in the chunk container prior to storing the corresponding data stream). Data access seeks during sequential data access are limited to the case where a data chunk or a series of chunks of a data stream are found to already exist in the chunk store. Stream map 310 provides an efficient metadata container for optimized file metadata (e.g., metadata 314) that may be needed by other modules of a data deduplication system (e.g. a list of hash values used by a file replication module). Stream maps 310 are concise and can be cached in memory for fast access. Chunk store 300 can cache frequently-accessed stream maps 310 (for optimized data streams frequently requested and rehydrated by rehydration module 702) based on an LRU (least recently used) algorithm or other type of cache algorithm.

C. Example Chunk Store Embodiments that Enable Reliable Locating of Data Chunks

As described above, data chunks may be moved within a chunk container for various reasons, such as due to a defragmentation technique, due to a compaction technique that performs garbage collection, etc. Embodiments are described in this subsection for keeping track of the movement of data chunks within a chunk container.

Figure 8:
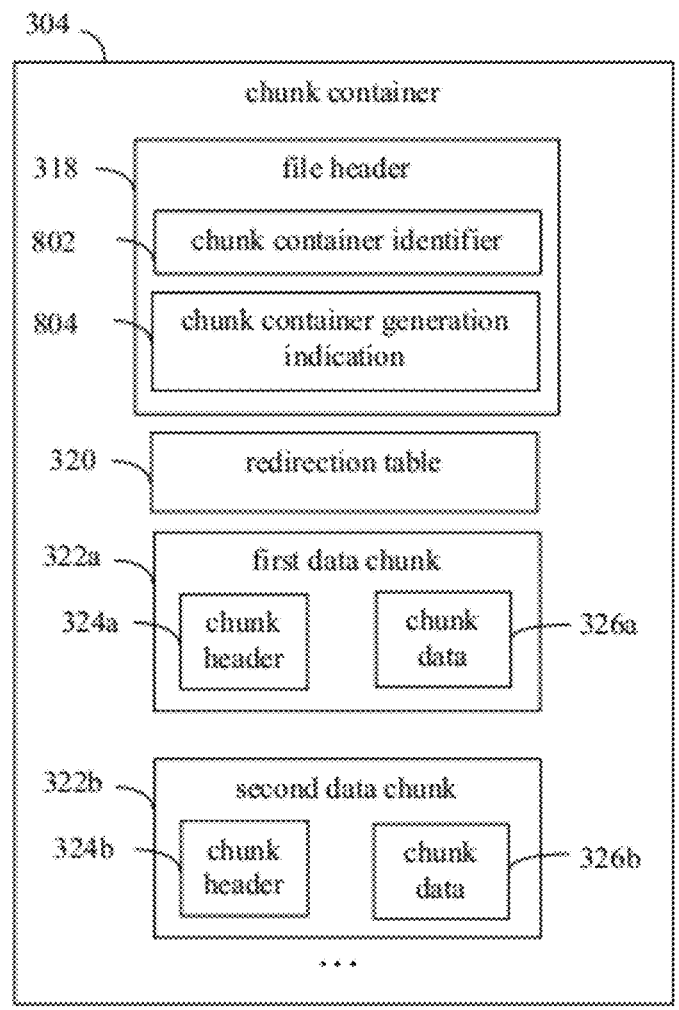
FIG. 8 shows a block diagram of a chunk container, according to an example embodiment.

FIG. 8 shows a block diagram of chunk container 304, according to an example embodiment. As shown in FIG. 8, chunk container 304 is generally similar to chunk container 304 of FIG. 3, with the addition of a chunk container identifier 802 and a chunk container generation indication 804 included in file header 318. Chunk container identifier 802 is a unique identifier (e.g., an identification number) assigned to chunk container 304 to distinguish chunk container 304 from other chunk containers that may be present in chunk store 300. Chunk container generation indication 804 indicates a revision or generation for chunk container 304. For instance, each time that one or more data chunks 322 are moved within chunk container 304, generation indication 804 may be modified (e.g., may be incremented to a next generation level, starting from a beginning generation level such as 0 or other beginning value).

In an embodiment, chunk container 304 may identified by a combination of chunk container identifier 802 and chunk container generation indication 804 (e.g., may form a file name of chunk container 304). In an embodiment, both of chunk container identifier 802 and chunk container generation indication 804 may be integers. Chunk container 304 may have a fixed size (or fixed number of entries), or may have a variable size. For instance, in one example embodiment, each chunk container file that defines a chunk container 304 may be sized to store about 16,000 of chunks, with an average data chunk size of 64 KB, where the size of the chunk container file is set to 1 GB. In other embodiments, a chunk container file may have an alternative size.

Data chunks 322 stored in chunk container 304 may be referenced according to data chunk identifier 404 of metadata 400 (FIG. 4) in various ways. In embodiments, data chunk identifier 404 may include various types of information to enable such referencing. For instance, in an embodiment, data chunk identifier 404 may include one or more of a data chunk container identifier, a local identifier, a chunk container generation value, and a chunk offset value. The chunk container identifier has a value of chunk container identifier 802 for the chunk container 304 in which the data chunk 322 is stored. The local identifier is an identifier (e.g., a numerical value) that is assigned to a data chunk 322, and is unique to the assigned data chunk 322 within the chunk container 304 in which the data chunk 322 is stored (e.g., is a unique per-container identifier for the data chunk). The chunk container generation value has the value of chunk container generation indication 804 for the chunk container 304 in which the data chunk 322 is stored, at the time the data chunk 322 is stored in the chunk container 304. The chunk offset value is an offset of the data chunk 322 in chunk container 304 at the time that the data chunk 322 is added to chunk container 304.

In an embodiment, a chunk store may implement a reliable chunk locator that may be used to track data chunks that have moved. In contrast to conventional techniques, the reliable chunk locator does not use an index for mapping data chunk identifiers to a physical chunk location. Conventional techniques use an index that maps chunk identifiers to the chunk data physical location. The scale of storage systems (e.g., 100 s of Terabytes or greater) and an average chunk size (e.g. 64 KB) make such an index to be very large. If such an index is fully loaded in memory it will consume a large amount of the available memory and processor resources. If the index is not loaded in memory, data accesses become slow because the index needs to be paged into memory.

In an embodiment, the reliable chunk locator is implemented in the form of a redirection table, such as redirection table 320 of chunk container 304 in FIG. 3. The redirection table may store one or more entries for data chunks 322 that have been moved in chunk container 304. Each entry identifies a moved data chunk 322, and has a data chunk offset value indicating the location of the data chunk 322 in chunk container 304 at its new location. The redirection table may be referenced during rehydration of a data stream to locate any data chunks of the data stream that have moved.

Figure 9:
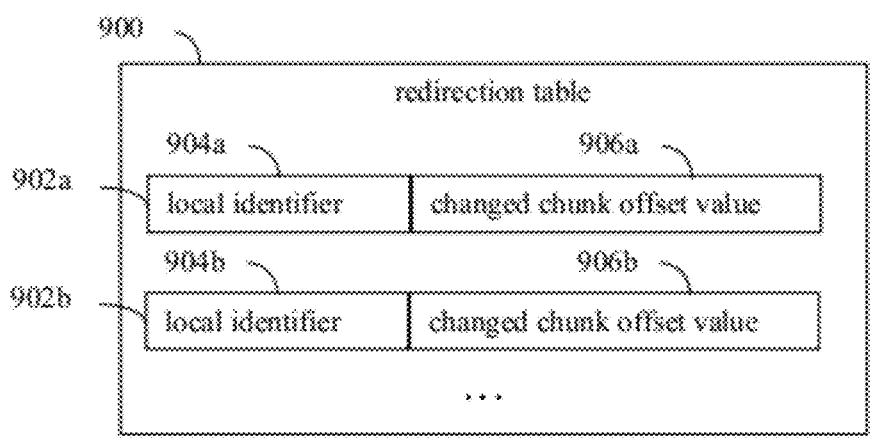
FIG. 9 shows a block diagram of a redirection table, according to an example embodiment.

For instance, FIG. 9 shows a block diagram of a redirection table 900, according to an example embodiment. Redirection table 900 is used to locate data chunks 322 (including stream maps stored as data chunks) if the data chunks 322 are moved within chunk container 304. For instance, redirection table 900 enables data chunks 322 to be moved within chunk container 304 for space reclamation as part of a garbage collection and compaction process, and to still be reliably locatable based on the original chunk identifiers of the data chunks 322. As shown in FIG. 9, redirection table 900 includes a plurality of entries 902, such as a first entry 902a and a second entry 902b. Any number of entries 902 may be included in redirection table 900, including hundreds, thousands, and even greater numbers of entries 902. Each entry 902 includes a local identifier 904 and a changed chunk offset value 906. For instance, first entry 902a includes a first local identifier 904a and a first changed chunk offset value 906a, and second entry 902b includes a second local identifier 904b and a second changed chunk offset value 906b.

Local identifier 904 is the unique local identifier assigned to a data chunk 322 when originally stored in chunk container 304. Changed chunk offset value 906 is the new chunk offset value for the data chunk 322 having the corresponding local identifier 904 that was moved. As such, redirection table 900 may be accessed using a locality indicator for a data chunk to determine a changed chunk offset value for the data chunk.

For example, local identifier 904a in FIG. 9 may be the local identifier assigned to data chunk 614b. Entry 902a of redirection table 900 may be accessed using the local identifier assigned to data chunk 614b to determine changed chunk offset value 906a, which indicates a new location for data chunk 614b in chunk container 304.

Note that redirection table 900 may have any size. For instance, in an embodiment, the size of redirection table 900 may be bounded by (a predetermined maximum number of data chunks—a predetermined minimum number of data chunks deleted for compaction)×(a size of a redirection table entry). In some cases, relocations of data chunks may be infrequent. In an embodiment, after determining a changed chunk offset value for a data chunk, any pointers to the data chunk from stream maps can be modified in the stream maps to the changed chunk offset value, and the entry 902 may be removed from redirection table 900. In some situations, redirection table 900 may be emptied of entries 902 in this manner over time.

Figure 10:
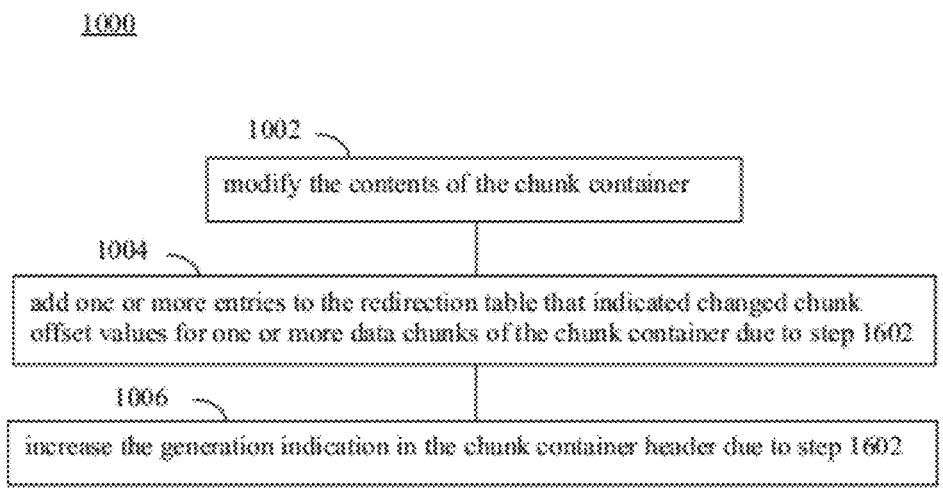
FIG. 10 shows a flowchart for storing a data stream, according to an example embodiment.

Entries to a redirection tables may be added in various ways. For instance, FIG. 10 shows a flowchart 1000 for storing a data stream, according to an example embodiment. Further structural and operational embodiments will be apparent to persons skilled in the relevant art(s) based on the discussion regarding flowchart 1000. Flowchart 1000 is described as follows.

Flowchart 1000 begins with step 1002. In step 1002, the contents of the chunk container are modified. For example, in an embodiment, one or more data chunks 322 in chunk container 304 of FIG. 8 may be moved. Such data chunks 322 may be moved by a maintenance task (e.g., maintenance module 106 in FIG. 1), such as a defragmentation process, a compaction process after garbage collection, or other process.

In step 1004, one or more entries are added to the redirection table that indicated changed chunk offset values for one or more data chunks of the chunk container due to step 1002. For example, one or more entries 902 may be added to redirection table 900 that correspond to the one or more moved data chunks 322. For example, for each moved data chunk 322, an entry 902 may be generated that indicates the local identifier value of the moved data chunk 322 as local identifier 904, and indicates the new offset value of the moved data chunk 322 as changed chunk offset value 906.

In step 1006, the generation indication in the chunk container header is increased due to step 1002. For example, in an embodiment, chunk container generation indication 804 may have an initial value of 0, and each time data chunks 322 are moved in chunk container 304, chunk container generation indication 804 may be incremented to indicate a higher generation value. In other embodiments, chunk container generation indication 804 may be modified in other ways.

As such, when a data chunk 322 of chunk container 304 of FIG. 8 is looked up using the data chunk identifier stored in the referencing stream map 310, chunk container generation indication 804 of chunk container 304 may be checked to see if the current generation of chunk container 304 is the same as chunk container generation value of the data chunk identifier. If they are the same, the data chunk 322 can be located at the offset indicated by the chunk offset value in the data chunk identifier. If not, redirection table 900 is read to determine the changed offset value of the data chunk 322 in chunk container 304.

Figure 11:
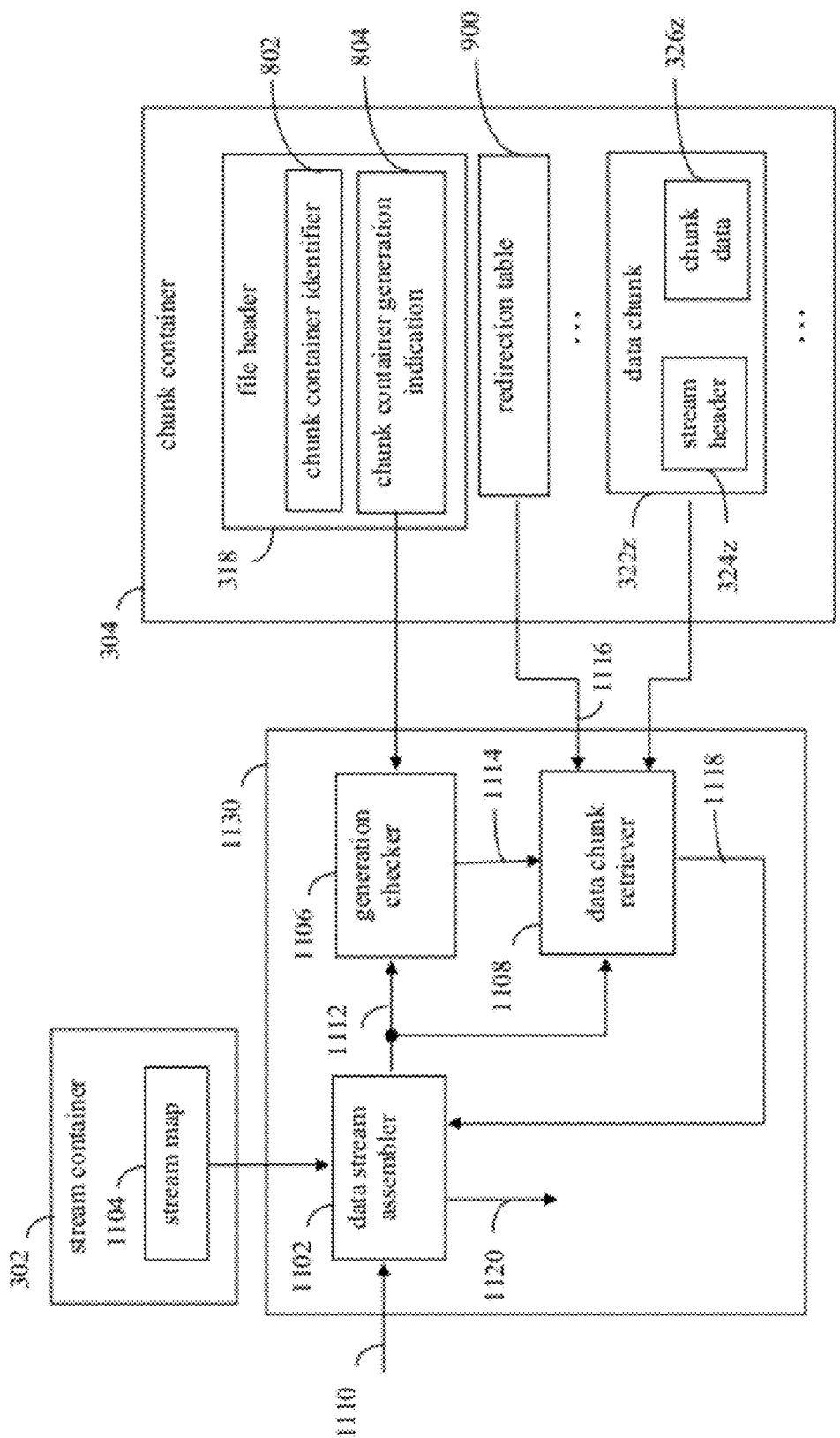
FIG. 11 shows a block diagram of a rehydration module that accesses a chunk store to rehydrate a data stream, according to an example embodiment.

For instance, FIG. 11 shows a block diagram of a rehydration module 1130 that communicates with stream container 302 and chunk container 304 to rehydrate a data stream according to a data stream request 1110, according to an example embodiment. As shown in FIG. 11, rehydration module 1130 includes a data stream assembler 1102, a generation checker 1106, and a data chunk retriever 1108. FIG. 11 is described as follows.

In FIG. 11, data stream assembler 1102 receives data stream request 1110, which indicates a stream map, such as stream map 1104 stored in stream container 302, corresponding to a data stream to be rehydrated. Data stream assembler 1102 processes stream map 1104, generating a data chunk request 1112 for each data chunk referenced by stream map 1104.

In an embodiment, data chunk request 1112 generated by data stream assembler 1102 may include a data chunk identifier to identify a requested data chunk 322. The located chunk container may be accessed as follows to retrieve requested data chunks.

As shown in FIG. 11, generation checker 1106 receives data chunk request 1112 for the requested data chunk. Generation checker 1106 accesses chunk container 304 (identified above as having a chunk container identifier 802 that matches the chunk container identifier of the requested data chunk 322). Generation checker 1106 is configured to compare chunk container generation indication 804 for chunk container 304 to the chunk container generation value for requested data chunk 322, and to output a generation match indication 1114. If their values do not match (e.g., the value of chunk container generation indication 804 is greater than the value of the chunk container generation value for requested data chunk 322), generation match indication 1114 indicates that a match was not found, and operation proceeds to step 1806. If their values do match, generation match indication 1114 indicates that a match was found, and a standard I/O path (or other path) for retrieving the requested data chunk may be followed.

As shown in FIG. 11, data chunk retriever 1108 receives generation match indication 1114 and data chunk request 1112. If generation match indication 1114 indicates that a match was not found, data chunk retriever 1108 accesses redirection table 900 for a changed chunk offset value 906 (FIG. 9) in an entry 902 having a local identifier 904 that matches the local identifier of the requested data chunk 322. As shown in FIG. 11, data chunk retriever 1108 receives a second chunk offset value 1116 that is different from the first chunk offset value.

As shown in FIG. 11, data chunk retriever 1108 accesses chunk container 304 for a data chunk 322$z$ located at second chunk offset value 1116. Data chunk 322$z$ is the requested data chunk 322, having been moved in chunk container 304 to second chunk offset value 1116.

As shown in FIG. 11, data chunk retriever 1108 outputs data chunk 1118, which is data chunk 322$z$ in the current example. Data chunk 1118 is received by data stream assembler 1102. In this manner, data stream assembler 1102 receives all data chunks 322 referenced by stream map 1104 from data chunk retriever 1108, retrieved either directly from chunk container 304 according to the corresponding chunk offset value, or from chunk container 304 as redirected by redirection table 900. As shown in FIG. 11, data stream assembler 1102 generates a data stream 1120, which is the rehydrated form of the requested data stream indicated in data stream request 1110. Data stream assembler 1102 assembles together all of the received data chunks 322 as described elsewhere herein to form data stream 1120.

It is noted that the stream map reference identifier that resides in the reparse point of a data stream (e.g., stream link 608$a$ or 608$b$ in FIG. 6) may have the same structure as the data chunk identifier. As described above, a stream map 310 may have the form of a data chunk 322 that contains stream map metadata rather than end-user file data. As such, the procedure for addressing a stream map 310 may be the same as addressing a data chunk 322—both techniques may use the data chunk identifier structure. An optimized data stream references a stream map 310 by placing the data chunk identifier of the stream map 310 at the file reparse point (attached to the actual data stream/file object). The stream map identifier contains the [Container identifier, local identifier, generation value, offset value] information that may be used to locate (either directly, or through a redirection table) the stream map 310 data chunk inside stream container 302. As such, in an embodiment, a format and layout of a stream container 302 may be essentially the same as that of a chunk container 304.

D. Example Data Optimization Backup Embodiments

Backing up and restoring a data system deploying a data optimization technique is difficult because data is shared between multiple data streams in a chunk store. As such, the data is separated from the file namespace. However, data backup and restore capabilities are useful. Entities typically would not be amenable to deploying a data optimization solution without effective data backup integration.

In embodiments, various backup techniques are provided for data optimization environments, including optimized backup, un-optimized backup, item-level optimized backup, and a hybrid backup technique. Furthermore, in embodiments, heuristics may be used to select between different backup techniques. For instance, heuristics may be used to select between optimized and un-optimized backup. Embodiments provide data optimization systems with optimized backup techniques, such that data may be backed up in its optimized (e.g., deduplicated) form. Embodiments may enable data backup to use less backup media space, and may be used to reduce the backup time window, which is significant considering year-to-year data growth. Furthermore, embodiments may enable faster data restore from backup (e.g., a smaller RTO (Recovery Time Objective)).

Figure 12:
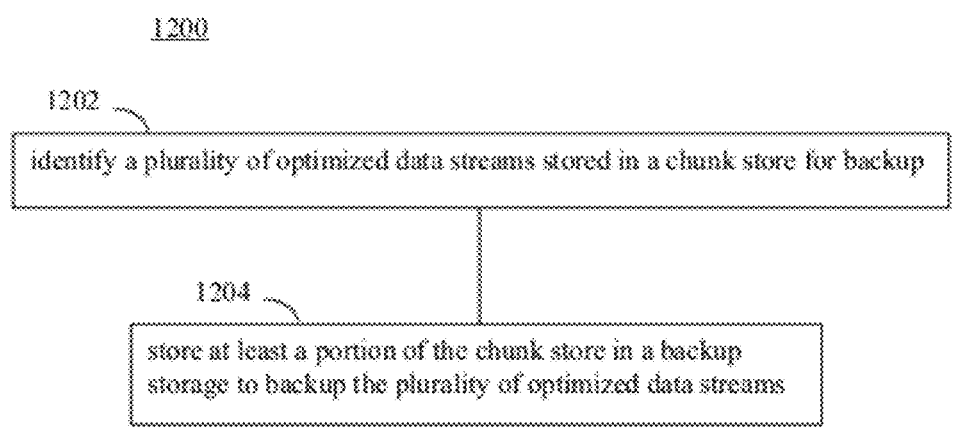
FIG. 12 shows a flowchart for performing backup of data in a data optimization system, according to an example embodiment.
Figure 13:
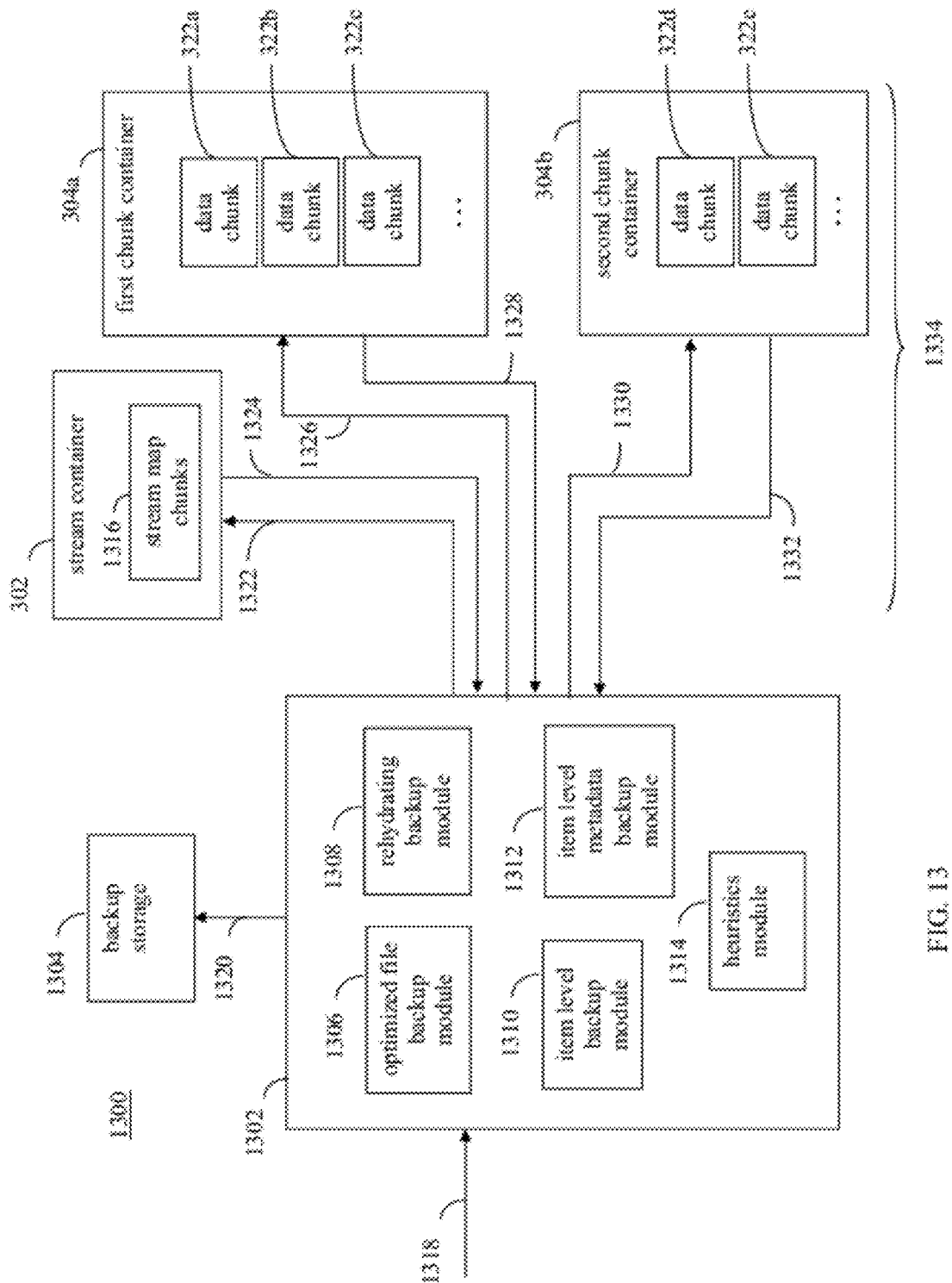
FIG. 13 shows a block diagram of a data backup system, according to an example embodiment.

In embodiments, backup in data optimization systems may be performed in various ways. For instance, FIG. 12 shows a flowchart 1200 for performing backup of data in a data optimization system, according to an example embodiment. Flowchart 1200 may be performed by chunk store interface 116 of FIG. 1, in an embodiment. Flowchart 1200 is described with respect to FIG. 13 for purposes of illustration. FIG. 13 shows a block diagram of a data backup system 1300, according to an example embodiment. Flowchart 1200 may be performed by data backup system 1300. As shown in FIG. 13, data backup system 1300 includes a data backup module 1302, a backup storage 1304, and a chunk store 1334 that includes stream container 302 and one or more chunk containers 304 (e.g., chunk containers 304$a$ and 304$b$). Further structural and operational embodiments will be apparent to persons skilled in the relevant art(s) based on the discussion regarding flowchart 1200. Flowchart 1200 is described as follows.

In step 1202 of flowchart 1200, a plurality of optimized data streams stored in a chunk store is identified for backup. For example, with reference to FIG. 13, data backup module 1302 may receive a request 1318 to store one or more optimized data streams stored in chunk store 1334 in backup storage 1304. Request 1318 may identify the one or more optimized data streams by corresponding file names for optimized stream structures (e.g., files) corresponding to the optimized data streams. Each optimized stream structure references a stream map chunk of stream map chunks 1316 in stream container 302 that contains metadata describing a mapping of the optimized data stream to data chunks 322 stored in one or more of chunk containers 304, as described above.

In step 1204, at least a portion of the chunk store is stored in a backup storage to backup the plurality of optimized data streams. In response to request 1318, data backup module 1302 may store at least a portion of chunk store 1334 in backup storage 1304 so that the optimized data streams identified in request 1318 are stored in backup storage 1304. Data backup module 1302 may store the optimized data streams by storing a portion of chunk store 1334 in backup storage 1304 in various ways. For instance, in one embodiment, for each optimized data stream, data backup module 1302 may determine the corresponding stream map chunk of stream map chunks 1316, and the data chunks 322 referenced by the stream map chunk, and may store the determined stream map chunk and data chunks in backup storage 1304. In further embodiments, data backup module 1302 may store larger portions of chunk store 1334 in backup storage 1304 that include the determined chunks of the optimized data streams to backup the optimized data streams.

As such, data backup module 1302 may be configured to store optimized data streams in various ways according to step 1204. For example, as shown in FIG. 13, data backup module 1302 may include an optimized file backup module 1306, a rehydrating backup module 1308, an item level backup module 1310, and a data chunk identifier backup module 1312. Data backup module 1302 may include any one or more of modules 1306, 1308, 1310, and 1312, in embodiments. Modules 1306, 1308, 1310, and 1312 enable optimized data streams to be stored in backup storage 1304 in various ways. Modules 1306, 1308, 1310, and 1312 are described as follows.

Figure 14:
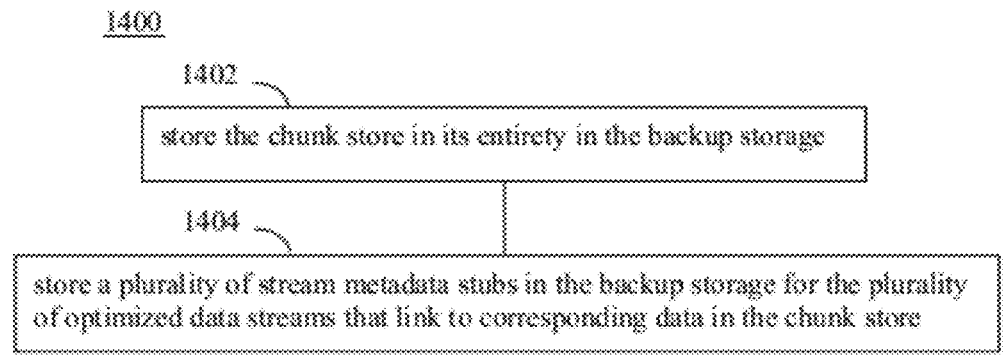

In one embodiment, optimized backup (also referred to as "optimized data stream backup") may be performed to backup optimized data streams in optimized form. For instance, optimized file backup module 1306 may be configured to perform optimized backup by storing optimized data streams in backup storage 1304 in optimized form. According to optimized backup, one or more entire chunk containers of chunk store 1334 may be stored to backup optimized data streams. For instance, optimized file backup module 1306 may perform a flowchart 1400 shown in FIG. 14, in an embodiment. Flowchart 1400 and optimized file backup module 1306 are described as follows.

In step 1402, the chunk store is stored in its entirety in the backup storage. In an embodiment, optimized file backup module 1306 may store chunk store 1334 in its entirety in backup storage 1304 so that the optimized data streams indicated in request 1318 are backed up. Alternatively, optimized file backup module 1306 may store one or more entire chunk containers (e.g., stream container 302 and one or more of chunk containers 304) of chunk store 1334 that include the requested optimized data streams in their entireties so that the optimized data streams are backed up. The chunk containers to be backed up may be identified by chunk container identifiers of the chunk identifiers for the chunks referenced by the optimized stream structures of the optimized data streams. The chunk containers/entire chunk store may be stored by optimized file backup module 1306 in backup storage 1304 according to a store operation 1320.

In step 1404, a plurality of stream metadata stubs are stored in the backup storage for the plurality of optimized data streams that link to corresponding data in the chunk store. The stream metadata stubs may be retrieved by optimized file backup module 1306 from other storage (e.g. primary storage), such as storage other than backup storage 1304, and are files that link to data store in chunk store 1334 for the optimized data streams. For instance, each stream metadata stub may contain a reference to their corresponding stream map chunk of stream map chunks 1316 that may be used to rebuild/reassemble the corresponding data stream during a rehydration process into non-optimized form by combining any data chunks 322 referenced by the stream map chunk. In an embodiment, stream metadata stubs corresponding to the optimized data streams identified in request 1318 are stored by optimized file backup module 1306 in backup storage 1304 using a store operation 1320. The stream metadata stubs may be stored by optimized file backup module 1306 in backup storage 1304 in their "on-disk" format.

As such, the "volume image" providing a file state for the optimized data streams on backup storage 1304 mirrors chunk store 1334. The combination of stored chunk containers and stored stream metadata stubs in backup storage 1304 provides complete storage of the optimized data streams, in optimized (non-reassembled) form. Additional metadata is not needed to be stored.

Optimized backup (e.g., according to flowchart 1400 and optimized file backup module 1306) may performed in any situation to backup optimized data streams. Optimized backup may be desired to be performed if most of the backed up volume (an accessible storage area in backup storage) is in scope. Some "waste" is possible because when whole chunk containers are stored because data chunks that are not referenced by the optimized data streams identified in request 1318, but that are referenced by other optimized data streams, may be included in the chunk containers. As such, more data overall may be backed up than is needed. If relatively little of the backed up volume is in scope (e.g., a small number of the data chunks that are included in the backed up chunk containers are associated with the optimized data streams identified in request 1318), another backup technique may be desired (e.g., an un-optimized backup technique described below) that does not store entire chunk containers.

Restore of optimized data streams that have been backed up according to optimized backup involves restoring the chunk store container files and stream metadata stubs such that the restore is an optimized restore. Such an optimized store is relatively smaller in size, and therefore is relatively faster, and fewer I/O resources are consumed. Techniques for selective restore of optimized data streams from optimized backup are described further below in the next subsection.

As such, embodiments for optimized backup may provide various benefits. For instance, optimized backup may result in smaller storage size backups, which save backup media space (e.g., in backup storage 1304). This may be useful for disk-based backup solutions. In some cases, the storage space savings in the backup storage may be more significant and cost-effective than the savings in the primary storage. Optimized backup may result in a faster time used to perform backup. The backup execution time may be reduced, which is significant considering the growth in the amount of data being stored from year-to-year. Due to the growth in quantity of data, storage users may struggle with performing frequent backups (e.g., daily) as the backup execution time grows along with the amount of data. Optimized backup techniques may assist with reducing the backup execution time. Furthermore, optimized backup may shorten RTO, leading to faster restores. RTO is an important measure of a backup/restore solution.

Figure 15:
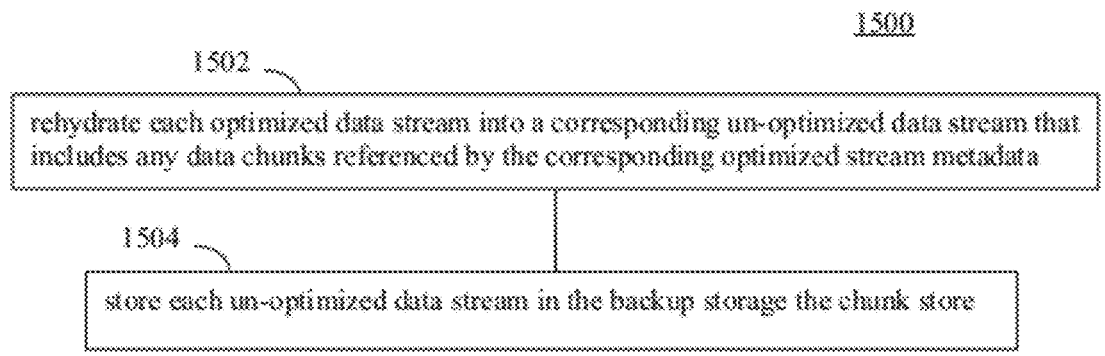

In another embodiment, non-optimized backup (also referred to as "un-optimized data stream backup") may be performed to store optimized data streams in a non-optimized or un-optimized form. According to non-optimized backup, optimized data streams designated for backup storage may be rehydrated prior to being stored. For instance, in an embodiment, rehydrating backup module 1308 may be configured to perform non-optimized backup by rehydrating optimized data streams, and storing the rehydrated data streams in backup storage 1304. Rehydrating backup module 1308 may perform a flowchart 1500 shown in FIG. 15, in an embodiment. Flowchart 1500 and rehydrating backup module 1308 are described as follows.

In step 1502 of flowchart 1500, each optimized data stream is rehydrated into a corresponding un-optimized data stream that includes any data chunks referenced by the corresponding optimized stream metadata. Rehydrating backup module 1308 may rehydrate optimized data streams in any manner, including as described above for rehydration module 702 (FIG. 7). For example, referring to FIG. 13, rehydrating backup module 1308 may access stream container 302 for optimized stream metadata in the form of stream map chunks corresponding to the optimized data streams identified in request 1318, or in other form (e.g., a global table, a database, etc.). As shown in FIG. 13, rehydrating backup module 1308 may generate one or more stream container accesses 1322 for the desired stream map chunks. Stream container accesses 1322 may identify desired stream map chunks by corresponding stream map identifiers. In response to stream container accesses 1322, rehydrating backup module 1308 receives stream map chunks 1324 from stream container 302 corresponding to the optimized data streams identified in request 1318. Rehydrating backup module 1308 may regenerate or "rehydrate" each optimized data stream according to the stream map of the corresponding retrieved stream map chunk. In the example of FIG. 13, each stream map includes pointers (e.g., data chunk identifier 404 of FIG. 4) to each of the data chunks included in the corresponding optimized data stream, which may be included in chunk containers 304a and/or 304b. Rehydrating backup module 1308 uses the pointers to retrieve each of the referenced data chunks 322. For example, rehydrating backup module 1308 may generate one or more chunk container accesses 1326 and/or 1330 to obtain data chunks 322 from first and/or second chunk containers 304a and 304b, respectively. In response to chunk container accesses 1326 and/or 1330, rehydrating backup module 1308 receives data chunks 1328 and/or 1332 from chunk containers 302a and 302b corresponding to the optimized data streams identified in request 1318.

Rehydrating backup module 1308 may use data stream offsets 402 included in the retrieved stream maps (e.g., stream map 310 of FIG. 3) to arrange the retrieved data chunks in the proper order to re-generate each data stream in un-optimized form (e.g., as un-optimized data streams).

In step 1504, each un-optimized data stream is stored in the backup storage. For example, as shown in FIG. 13, the un-optimized data streams may be stored by rehydrating backup module 1308 in backup storage 1304 according to a store operation 1320. As such, when a data stream is desired to be restored from backup storage 1304, the un-optimized data stream stored in backup storage 1304 may be retrieved.

Thus, un-optimized backup (e.g., according to flowchart 1500 and rehydrating backup module 1308) may be performed in any situation to backup optimized data streams. Un-optimized backup may be desired to be performed if data chunks of the optimized data streams fill a relatively lesser portion of the storage space of chunk store 1334. Thus, rather than storing entire chunk containers in backup storage 1304, which may include storing a large number of data chunks unrelated to the optimized data streams identified in request 1318, the specific optimized data streams may be rehydrated and stored in backup storage 1304. As such, the backup media stores the data streams in their un-optimized, original form, and backup storage space may be saved by avoiding storing unrelated data chunks.

Embodiments for un-optimized backup may provide various benefits. For instance, un-optimized backup, which uses more selective backup (and enables selective restore), is relatively easy to implement. Restoring of the backed up data streams does not depend on the data-optimization technique used by a storage system, because the data streams are backed up in un-optimized form. As such, the data streams can be restored anywhere and accessed without dependency on an installed and functional data-optimization solution.

Due to the rehydration process, un-optimized backup can be relatively slow, having a performance impact on data backup module 1302. The rehydration of optimized data is slower than a regular data read due to the decompression of the optimized data that is performed, and also potentially due to data fragmentation. Furthermore, because data streams are backed up in un-optimized form, the total amount of data this is backed up may be large because the advantages of deduplication are not present. The total amount of data is potentially a larger amount than the volume being backed up (because the volume is optimized while the backup data is not). In some cases, it may not be possible to backup all of the data due to backup storage size limitations. Thus, un-optimized backup may be selected for use in particular backup situations. Examples of selecting un-optimized backup versus other backup techniques are described further below.

Figure 16:
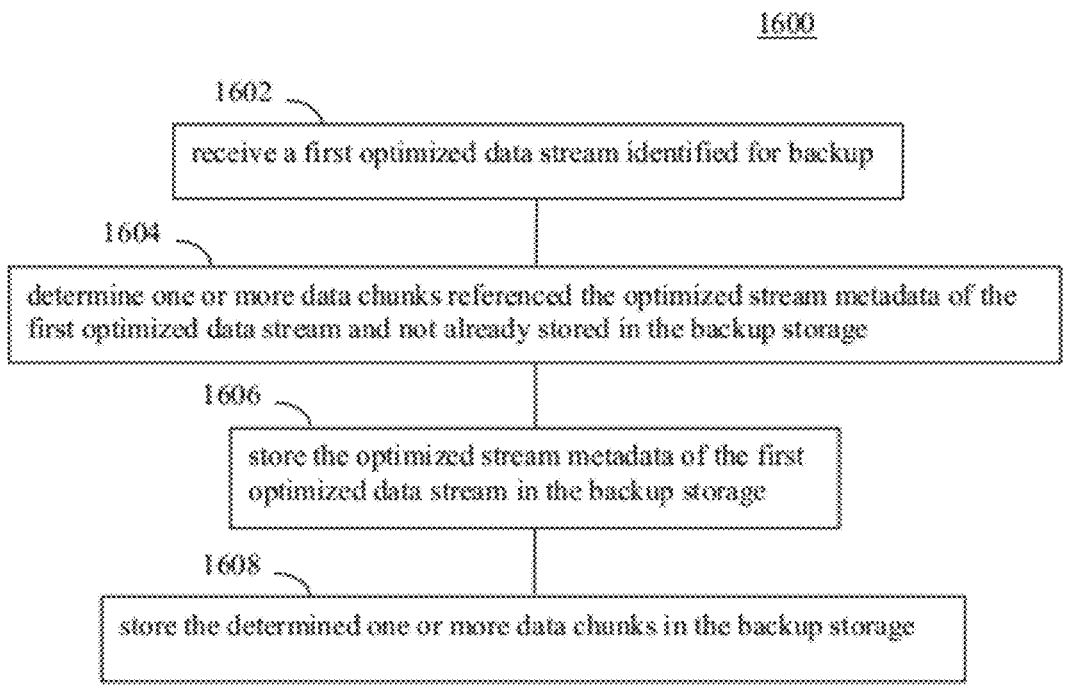

In another embodiment, item level backup may be performed to store optimized data streams in an item level optimized form. According to item level backup, optimized data streams designated for backup storage are prepared for storage in optimized form. For instance, for a particular optimized data stream, the data chunks referenced by the stream map chunk of the optimized data streams are determined. Any of the referenced data chunks that have already been stored in backup storage are not retrieved from the chunk store. Any of the referenced data chunks that are not already stored in backup storage are retrieved from the chunk store, and are stored in backup storage. For instance, in an embodiment, item level backup module 1310 may be configured to perform item level backup by storing in backup storage 1304 the stream map chunks and referenced data chunks that are not already stored in backup storage 1304. For instance, item level backup module 1310 may perform a flowchart 1600 shown in FIG. 16, in an embodiment. Flowchart 1600 may be performed for each optimized data stream identified in request 1318. Flowchart 1600 and item level backup module 1310 are described as follows.

In step 1602 of flowchart 1600, a first optimized data stream identified for backup is received. For example, request 1318 may identify an optimized data stream. For the optimized data stream, item level backup module 1310 may retrieve the optimized stream metadata (e.g., stream map chunk 1324 from stream container 302) and may retrieve any data chunks 322 referenced by the optimized stream metadata from chunk containers 304. For instance, item level backup module 1310 may generate stream container access 1322 to stream container 302 to retrieve the desired stream map chunk as stream map chunk 1324, and may generate one or more of chunk container accesses 1326 and/or 1330 to obtain the referenced data chunks 322 from first and/or second chunk containers 304a and 304b as data chunks 1328 and/or 1332.

In step 1604, one or more data chunks referenced by the optimized stream metadata of the first optimized data stream and not already stored in the backup storage is/are determined. In an embodiment, item level backup module 1310 may compare the data chunks referenced by the metadata of the stream map chunk with any data chunks already stored in backup storage 1304 to determine whether any of the referenced data chunks are already stored in backup storage 1304. Item level backup module 1310 may perform the comparison in any way, including by comparing hashes of the referenced data chunks with hashes of the data chunks stored in backup storage 1304 (e.g., using a hash index, etc.), may compare data chunk identifiers for the referenced data chunks with data chunk identifiers of the data chunks stored in backup storage 1304, or may make the comparison according to other technique. Item level backup module 1310 may keep track of the referenced data chunks determined to not already be stored in backup storage 1304, such as by maintaining a list or other data structure (e.g., in memory).

In step 1606, the optimized stream metadata of the first optimized data stream is stored in the backup storage. For instance, item level backup module 1310 may store the stream map chunk retrieved from stream container 302 for the optimized data stream in backup storage 1304 (e.g., using a store operation 1320).

In step 1608, the determined one or more data chunks is/are stored in the backup storage. Item level backup module 1310 may store the data chunks retrieved from chunk containers 302a and/or 302b for the optimized data stream, and determined in step 1604 to not already be stored in backup storage 1304, in backup storage 1304 (e.g., using a store operation 1320). As such, when the data stream is desired to be restored from backup storage 1304, the stream map chunk and data chunks stored in backup storage 1304 for the optimized data stream may be retrieved from backup storage 1304, and rehydrated to form the data stream. In an embodiment, the optimized stream structure (e.g., the stream metadata stub described above with respect to step 1404 of flowchart 1400 (FIG. 14) may be backed up in backup storage 1304, and may be retrieved from backup storage 1304 as a reparse point for rehydrating the data stream.

Thus, item level backup (e.g., according to flowchart 1600 and item level backup module 1310) may performed in any situation to backup optimized data streams. According to item level backup, deduplicated data chunks are associated with every data stream that is backed up while maintaining the backup in optimized form (e.g., no rehydration, every data chunk is backed up once). Whole chunk store containers are not backed up.

In an embodiment, a backup (and optionally restore) API (application programming interface) may be implemented by item level backup module 1310. For instance, a backup session may be defined for backing up a first file and a second file stored in chunk store 1334 in optimized form. In this example, it is assumed that the first file includes data chunks 322a and 322b of chunk container 302a and data chunk 322d of chunk container 304b, and the second file includes data chunks 322a-322c of chunk container 302a and data chunks 322d and 322e of chunk container 304b. The backup API may be called to backup the first file. In response, the API will return the stream map chunk for the first file and data chunks 322a, 322b, and 322d. The returned stream map chunk and data chunks 322a, 322b, and 322d are stored in backup storage 1304 for the first file. The backup API may subsequently be called to backup the second file. In response, the API will return the stream map chunk for the second file and data chunks 322c and 322e. This is because the API will determine that data chunks 322a, 322b, and 322d of the second file are already stored in backup storage 1304 (due to the first file being backed up in backup storage 1304). As such, the returned stream map chunk and data chunks 322c and 322e are stored in backup storage 1304 for the second file.

A restore module to restore data streams backed up according to item level backup may use a similar API, where the optimized stream metadata aids the restore module API to point to the referenced data chunks. Item level backup enables optimized backup (size wise) for both full and selective backup (because the granularity of backup is data stream/file granularity). However, item level backup may be relatively slow and complex, and may not work well with block level backup techniques.

In still another embodiment, data chunk identifier backup may be performed to store optimized data streams in another type of optimized form. According to data chunk identifier backup, the data chunk identifiers are determined for optimized data streams to be backed up. The data chunk identifiers are stored in backup storage, and the chunk containers that store the referenced data chunks are stored in backup storage. For instance, in an embodiment, data chunk identifier backup module 1312 may be configured to perform data chunk identifier backup by storing in backup storage 1304 the data chunk identifiers referenced by the optimized stream metadata of the data streams, and the chunk containers that store the chunks identified by the associated data chunk identifiers. For instance, data chunk identifier backup module 1312 may perform a flowchart 1700 shown in FIG. 17, in an embodiment. Flowchart 1700 and data chunk identifier backup module 1312 are described as follows.

In step 1702 of flowchart 1700, the optimized stream metadata of each optimized data stream is analyzed to determine a corresponding at least one data chunk identifier for the at least one data chunk referenced by the optimized stream metadata. For example, in an embodiment, for each optimized data stream identified in request 1318, data chunk identifier backup module 1312 may retrieve the corresponding optimized stream metadata in the form of a stream map chunk from stream container 302. Furthermore, data chunk identifier backup module 1312 may analyze the metadata of the retrieved stream map chunk to determine the data chunk identifiers for any data chunks 322 referenced by the metadata of stream map chunk from chunk containers 304. The data chunk identifiers are included in the metadata (e.g., data chunk identifiers 404 included in metadata 400 shown in FIG. 4). Data chunk identifier backup module 1312 may reference a redirection table (e.g., redirection table 900 of FIG. 9) to map chunk offset values for one or more of the data chunk identifiers to update chunk offset values if one or more referenced data chunks were moved in chunk containers 304.

In step 1704, an optimized stream structure for each optimized data stream is stored in the backup storage with the corresponding at least one data chunk identifier. For instance, data chunk identifier backup module 1312 may store the optimized stream structures of each of the optimized data streams in backup storage 1304 with the corresponding data chunk identifiers determined in step 1702 (e.g., using a store operation 1320). The chunk identifiers may be stored in association with the optimized stream structures in any manner, including being stored external to or within the corresponding optimized stream structures in backup storage 1304.

In step 1706, one or more chunk containers of the chunk store that contain the optimized data streams is/are stored in the backup storage. In an embodiment, data chunk identifier backup module 1312 may store stream container 302 in backup storage 1304 so that the stream map chunks of the optimized data streams are backed up (e.g., using a store operation 1320). Furthermore, data chunk identifier backup module 1312 may store the one or more of chunk containers 304 that store any data chunks 322 referenced by the stream map chunks of the optimized data streams so that the referenced data chunks are backed up (e.g., using a store operation 1320). In an embodiment, data chunk identifier backup module 1312 may store chunk store 1334 in its entirety in backup storage 1304 so that all chunks of the optimized data streams are backed up.

As such, data chunk identifier backup is similar to optimized backup described above, but the locations of all data chunks (data chunks) in their respective container files are also stored (by data chunk identifiers) to provide a "restore plan" at backup time. A benefit of data chunk identifier backup is that a backup application (e.g., data backup module 1302) can store in its catalog the "restore plan" and know in advance which other files (therefore, which backup media) are needed for each restore scenario, including selective restore. Similarly to un-optimized backup described above, data chunk identifier backup can be relatively slow and complex, and may use a backup API implemented by data chunk identifier backup module 1312. Furthermore, data chunk identifier backup breaks the modularity of the chunk store and exposes the internal chunk store implementation.

As such, optimized backup, un-optimized backup, item level backup, and data chunk identifier backup are each backup embodiments that may be implemented by data backup module 1302 of FIG. 13. Furthermore, data backup module 1302 may implement backup embodiments that are combinations of one or more of optimized backup, un-optimized backup, item level backup, and data chunk identifier backup.

For instance, in one embodiment, data backup module 1302 may implement a combination of optimized backup and un-optimized backup. In an embodiment, optimized backup may be selected to be performed when a full volume backup is performed. If a single optimized data stream is to be backed up, un-optimized backup may be performed. For numbers of optimized data streams in between one and all optimized data streams, optimized backup or un-optimized backup may be selected. For instance, optimized backup or un-optimized backup may be toggled between based on heuristics.

For instance, in an embodiment, data backup module 1302 may be configured to perform backup up of optimized data streams according to process shown in FIG. 18. FIG. 18 shows a flowchart 1800 providing a process for selecting and executing a backup technique based on heuristics, according to an example embodiment. Flowchart 1800 is described as follows.

In step 1802 of flowchart 1800, a backup technique is selected based on heuristics. For example, as shown in FIG. 13, data backup module 1302 may optionally include a heuristics module 1314. Heuristics module 1314 is configured to determine heuristics used to select a backup technique to be used to backup optimized data streams.

In step 1804, the backup technique is performed to backup the plurality of optimized data streams in the backup storage. Based on the heuristics determined by heuristics module 1314, one of optimized file backup module 1306 or rehydrating backup module 1308 may be selected to backup the optimized data streams (e.g., as described above with respect to FIGS. 14 and 15, respectively). For instance, in an embodiment, heuristics module 1314 may provide an enable signal to the one of optimized file backup module 1306 or rehydrating backup module 1308 selected to backup the optimized data streams. The enable signal enables the one of optimized file backup module 1306 or rehydrating backup module 1308 to backup the optimized data streams according to their corresponding backup technique.

For instance, in one embodiment, heuristics module 1314 may implement relatively simple heuristics based on an "exclude mode" and an "include mode". According to the "exclude mode," a user may select a chunk store volume and may exclude some folders/files from backup. As such, heuristics module 1314 may determine that optimized data streams were selected for backup according to an exclude mode. In such case, the optimized data stream backup technique is selected by heuristics module 1314 due to the determined exclude mode. This is because the "exclude mode" typically has most of the chunk store volume in scope. As such, it is a better tradeoff to backup the selected data streams (in their optimized form) plus all chunk store container files, even though the container files may include some chunks referenced by optimized data streams other than those that were selected by the user.

According to the "include-mode," a user may select relatively few folders/files for backup. As such, heuristics module 1314 may determine that optimized data streams were selected for backup according to an include mode. In such case, the un-optimized data stream backup technique is selected by heuristics module 1314 due to the determined include mode. This is because the "include mode" typically has a relatively small portion of the chunk store volume in scope. As such, it is a better tradeoff to backup just the selected files in their un-optimized form. In such case, there is no need to backup the chunk store container files.

In another embodiment, heuristics module 1314 may implement relatively advanced heuristics. A tradeoff in backup technique may be based on a delta between the optimized-size and logical-size of files within a backup scope. A storage space waste may be determined as the storage space in chunk store container files consumed by chunks that are referenced only by optimized data streams that are not included in the backup scope. As such, heuristics module 1314 may determine (e.g., calculate) an amount of wasted storage space based on file sizes in the chunk store volume and based on chunk store statistics. In an embodiment, some assumptions may be made unless the chunk store is configured to accurately report how many chunks are referenced by a given group of data streams. If the chunk store is capable of reporting a number of chunks referenced by a designated group of optimized data streams, heuristics module 1314 may determine the amount of wasted storage space as the space filled by all chunks minus the space filled by chunks referenced by optimized data streams designated for backup. Based on the amount of wasted storage space (e.g., relative to the total storage space), heuristics module 1314 may select optimized backup or un-optimized backup.

For instance, referring to FIG. 13, in an embodiment, heuristics module 1314 may determine an amount of space in chunk store 1334 consumed by data chunks 322 that are not referenced by stream map chunk metadata of any of the plurality of optimized data streams identified in request 1318. Heuristics module 1314 may select the backup technique to be the optimized data stream backup technique if the determined amount of space in chunk store 1334 consumed by the non-referenced data chunks is less than a predetermined threshold (e.g., 50% or other percentage of total storage space of chunk store 1334). Heuristics module 1314 may select the backup technique to be the un-optimized data stream backup technique if the determined amount of space in chunk store 1334 consumed by the non-referenced data chunks is greater than the predetermined threshold.

In one example, heuristics module 1314 may perform the following analysis to set a backup technique. Given a backup scope which includes one or more namespace roots, where a namespace root is a folder including sub-folders recursively, the following heuristics parameters may be defined:

Scope=all files in a backup scope, meaning all files under the selected folders for backup, A=logical-size of all files in the scope, where a logical size of the file is the size of the file before the file was deduplicated (A is the sum all logical sizes of the file in the scope), B=size-on-disk of all files in the scope, where size-on-disk of a file is the actual size the optimized file fills on the disk after deduplication of the file, and C=size of the chunk store, which is the sum of the sizes of all chunk store container files.

Considering these definitions, if the backup application uses optimized backup, then the total backup size on the backup media is B+C. If the backup application uses unoptimized backup, then the total backup size on the backup media is A.

Hence, heuristics module 1314 may calculate values for A and B+C to aid in deciding between selecting optimized or unoptimized backup after the backup file scope is determined. If A>B+C, optimized backup takes less space and may be selected. Otherwise, if A≤B+C, unoptimized backup takes less space, and may be selected.

E. Example Data Optimization Restore Embodiments

With reference to FIG. 13, optimized data streams backed up to backup storage 1304 may be desired to be restored to primary storage at some point in time, such as when the optimized data stream is somehow corrupted. For instance, one or more chunks (e.g., stream map chunk and/or data chunks) of an optimized data stream may have become corrupted in chunk store 1334. In such case, the backed up version of the optimized data stream may be desired to be restored from backup storage 1304 in non-optimized form. Currently used backup techniques are likely to back up entire file system namespaces, which includes optimized files and chunk store container files. Furthermore, many currently used backup techniques still use sequential backup media for backup storage 2014, such as tape media. As such, it is desirable for techniques for restoring data streams to be capable of taking into account different backup media types and backup formats.

Embodiments are described in this subsection for restoring optimized data streams from backup storage. Embodiments enable optimized data streams (e.g., files) to be restored in a manner that reduces latency and disk I/O operations. According to an embodiment, the chunks for a particular data stream are enabled to be restored from backup storage rather than restoring further unneeded portions of the backed up chunk containers. Embodiments enable selective restore of data streams out of a full optimized backup, without requiring an understanding of the data optimization metadata, and without making assumptions about the backup media type or backup format.

Figure 19:
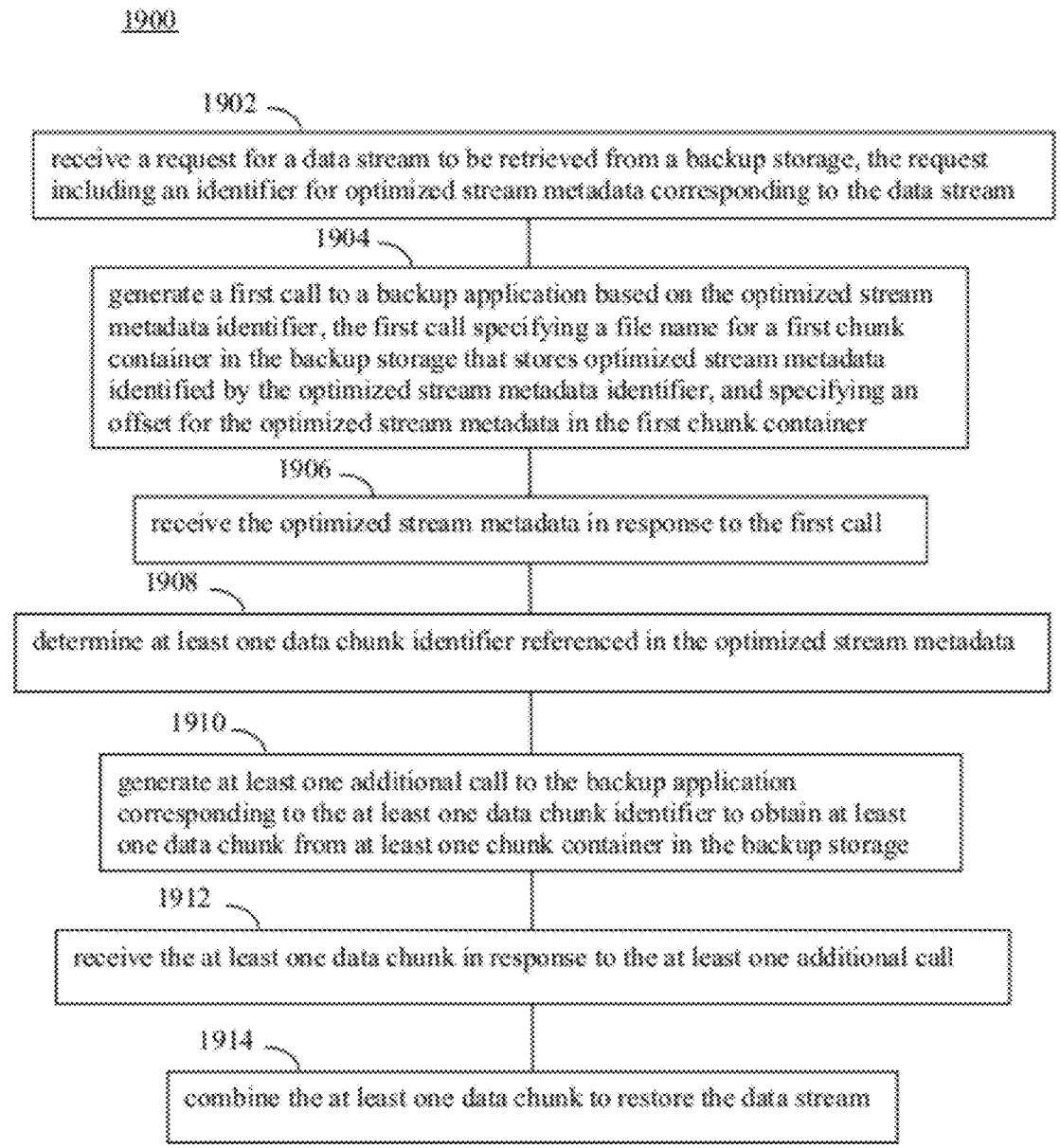
FIG. 19 shows a flowchart for performing a restore of backup data in a data optimization system, according to an example embodiment.
Figure 20:
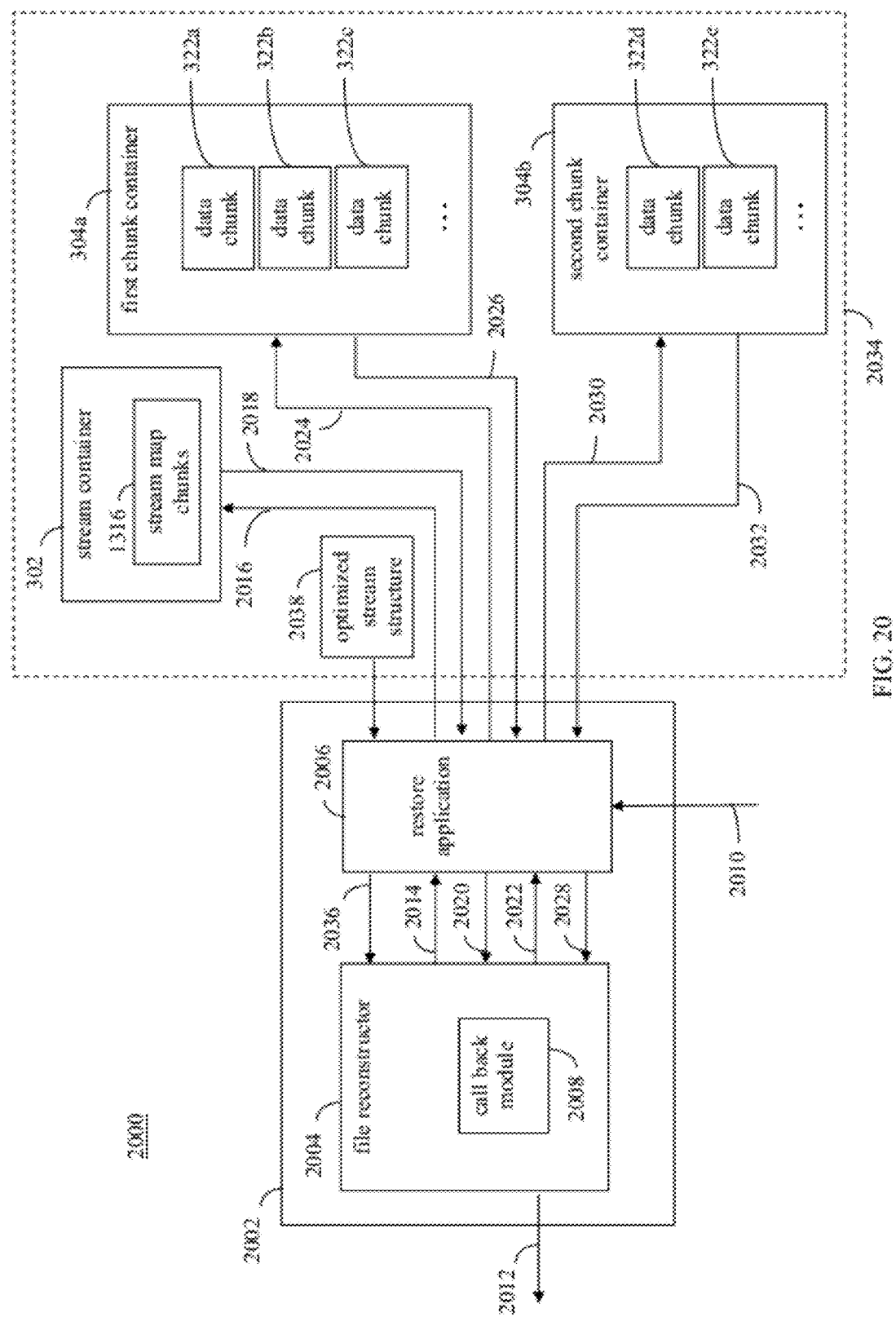
FIG. 20 shows a block diagram of a data restore system, according to an example embodiment.

In embodiments, restore of data streams in data optimization systems may be performed in various ways. For instance, FIG. 19 shows a flowchart 1900 for performing a restore of backup data in a data optimization system, according to an example embodiment. Flowchart 1900 may be performed by chunk store interface 116 of FIG. 1, in an embodiment. Flowchart 1900 is described with respect to FIG. 20 for purposes of illustration. FIG. 20 shows a block diagram of a data restore system 2000, according to an example embodiment. Note that in an embodiment, data backup system 1300 of FIG. 13 and data restore system 2000 may be implemented in a common system (e.g., in a common backup/restore application, etc.) or may be implemented separately. As shown in FIG. 20, data restore system 2000 includes a data restore module 2002 and a backup storage 2034. Backup storage 2034 stores a stream container 302 and one or more chunk containers 304 (e.g., chunk containers 304a and 304b). Furthermore, data restore module 2002 includes a file reconstructor 2004 and a restore application 2006. Flowchart 1900 may be performed by file reconstructor 2004, in an embodiment. Further structural and operational embodiments will be apparent to persons skilled in the relevant art(s) based on the discussion regarding flowchart 1900. Flowchart 1900 and data restore module 2002 are described as follows.

With reference to FIG. 20, restore application 2006 may be a conventional restore application that is configured to restore files from backup storage by locating the file in backup storage using a catalog (or any other mechanism), and by writing the located file to storage. Restore application 2006 may include restore functionality only, or may also include backup functionality (e.g., may be a backup/restore application). In the case of a data optimization system, the file written to storage by restore application 2006 in response to a file restore request is the optimized stream structure, which contains a reference to the stream map chunk.

For instance, restore application 2006 may receive a request 2010 for a data stream to be retrieved from backup storage 2034. Request 2010 may identify the data stream by file name. As shown in FIG. 20, restore application 2006 may retrieve an optimized stream structure 2038 (e.g., a stream metadata stub) from backup storage 2034, which corresponds to the requested file stream of request 2010. However, because optimized stream structure 2038 is a reparse point for the data stream requested in request 2010 (e.g., optimized stream structure 2038 does not include file data), restore application 2006 is configured to access file reconstructor 2004 to reconstruct the data stream corresponding to optimized stream structure 2038. For instance, file reconstructor 2004 may be configured to reconstruct the data stream according to flowchart 1900 in FIG. 19 as follows.

In step 1902 of flowchart 1900, a request for a data stream to be retrieved from a chunk store in storage is received, the request including an identifier for optimized stream metadata corresponding to the data stream. For example, as shown in FIG. 20, file reconstructor 2004 may receive request 2036 from restore application 2006. Request 2036 is a request for file reconstructor 2004 to reconstruct the data stream corresponding to optimized stream structure 2038. Request 2036 includes optimized stream structure 2038. Optimized stream structure 2038 includes an optimized stream metadata indicator, such as a stream map indicator, that may be used to locate optimized stream metadata (e.g., a stream map chunk) corresponding to the corresponding optimized data stream. As described elsewhere herein, the optimized stream metadata includes references to data chunks that may be used by file reconstructor 2004 to reassemble the data stream.

File reconstructor 2004 may be implemented in hardware, software, firmware, or any combination thereof. For instance, in an embodiment, file reconstructor 2004 may be an application programming interface (API) configured to rehydrate data streams based on an optimized data structure restored from backup storage. In an embodiment, the API of file reconstructor 2004 may be configured to receive request 2036 in the following form:

ReconstructFile ([in] restore-state/context, [in] file-name, [in] callback-interface)
where the request parameters are defined as follows:
"restore-state/context" is a label used to maintain internal state between multiple calls,
"file-name" is the file name of optimized stream structure 2038, and
"callback-interface" identifies a callback interface for file reconstructor 2004 to use to make calls back to restore application 2006.

In other embodiments, file reconstructor 2004 may be configured in other ways than an API. For purposes of illustration, the API embodiment for file reconstructor 2004 may be referenced below, but this embodiment is not intended to be limiting.

In step 1904, a first call to a restore application is generated based on the optimized stream metadata identifier, the first call specifying a file name for a first chunk container in storage that stores optimized stream metadata identified by the optimized stream metadata identifier, and specifying an offset for the optimized stream metadata in the first chunk container. As shown in FIG. 20, in an embodiment, file reconstructor 2004 may include a callback module 2008. Callback module 2008 is configured to generate calls, and is used by file reconstructor 2004 (e.g., used by the API of file reconstructor 2004) to callback to restore application 2006. Callback module 2008 may make calls back to restore application 2006 (e.g., according to "callback-interface" provided by restore application 2006) to restore chunks from backup storage 2034 that are identified in the calls. File reconstructor 2004 receives the restored chunks, and uses them to reassemble the identified data stream. For instance, in an embodiment, callback module 2008 may implement calls according to the following callback structure:

Read ([in] restore-state/context, [in] file name, [in] offset, [in] size, [out] buffer).
where the call parameters are defined as follows:
"restore-state/context" is a label used to maintain internal state between multiple calls,
"file name" is a file name for the container in backup storage 2034 that stores the chunk being requested,
"offset" is an offset in the container for the chunk being requested,
"size" is a size in the container of the chunk being requested, and
"buffer" is a location in which restore application 2006 may store the restored chunk for file reconstructor 2004 to access the restored chunk (e.g., a buffer in memory or other storage).

In other embodiments, calls may have other formats or structures. Restore application 2006 is configured for selective restore by being capable of restoring a chunk from backup storage 2034 from a provided offset in a particular backed up file. For instance, restore application 2006 may use a backup catalog to map {file-name, file-offset} a received call to {backup-media, offset-in-media} (to map file-to-backup media).

In an embodiment where the optimized stream metadata is stored in the form of a stream map chunk, the first call generated by callback module 2008 (according to step 1904) is a request to restore application 2006 for the stream map chunk identified by the stream map chunk identifier in optimized stream structure 2038. In an embodiment, callback module 2008 may generate the first call according to the callback structure described above. Callback module 2008 may generate the first call to include the value of the chunk container identifier as the "file name" parameter, and to include the value of the chunk offset value as the "offset" parameter. The "size" parameter is optional, as restore application 2006 may be able to independently determine the size of the requested chunk in backup storage 2034 (e.g., due to default-sized chunks, by accessing stored chunk size information in a backup catalog, etc.). With regard to the example of FIG. 20, callback module 2008 may generate the first call to include the file name of stream container 302 as the "file name" parameter, and to include the value of the offset of the stream map in stream container 302 as the "offset" parameter. As shown in FIG. 20, file reconstructor 2004 transmits first call 2014 generated by callback module 2008 to restore application 2006.

In step 1906, the optimized stream metadata is received in response to the first call. In an embodiment, restore application 2006 receives first call 2014, and accesses backup storage 2034 to obtain the stream map chunk identified in first call 2014. Restore application 2006 generates an access 2016 to stream container 302 in backup storage 2034, and retrieves a stream map chunk 2018 at the offset in stream container 302 indicated in first call 2014. Restore application 2006 transmits stream map chunk 2018 to file reconstructor 2004 in a response 2020.

In step 1908, at least one data chunk identifier referenced in the optimized stream metadata is determined. In an embodiment, file reconstructor 2004 analyzes metadata of the stream map (e.g., metadata 314 of stream map 310 of FIG. 3) defined by stream map chunk 2018 received in response 2020 for one or more data chunk identifiers for referenced data chunks. The metadata of the stream map includes pointers in the form of data chunk identifiers (e.g., data chunk identifier 404 of FIG. 4) to each of data chunks 322 in chunk containers 304*a* and 304*b* included in the data stream being processed. In this manner, the one or more data chunk identifiers included in stream map chunk 2018 is/are determined.

In step 1910, at least one additional call to the restore application is generated corresponding to the at least one data chunk identifier to obtain at least one data chunk from at least one chunk container in storage. In an embodiment, callback module 2008 generates one or more additional calls to restore application 2006, with each call being a request for a data chunk 322 in backup storage 2034 corresponding to a data chunk identifier determined in step 1908. For instance, callback module 2008 may generate a second call to restore application 2006 based on a corresponding data chunk identifier of the determined data chunk identifier(s). The second call may have the call structure described above, or may have other structure. The second call may specify a file name (as the "file name" parameter) for one of chunk containers 304*a* and 304*b* in backup storage 2034 that stores a data chunk 322 identified by the data chunk identifier. The second call may specify an offset (as the "offset" parameter) for the identified data chunk 322 in the one of first and second chunk containers 304*a* and 304*b* identified by the file name. The "size" parameter is optional, as restore application 2006 may be able to independently determine the size of the identified data chunk 322. As shown in FIG. 20, file reconstructor 2004 transmits second call 2022 generated by callback module 2008 to restore application 2006.

In step 1912, the at least one data chunk is received in response to the at least one additional call. In an embodiment, restore application 2006 receives second call 2022, and accesses backup storage 2034 to obtain the data chunk 322 identified in second call 2022. For instance, if the identified data chunk is stored in first chunk container 304*a*, restore application 2006 may generate an access 2024 to first chunk container 302a in backup storage 2034, and may retrieve a data chunk 2026 at the offset in first chunk container 302a indicated in second call 2022. Restore application 2006 transmits data chunk 2026 to file reconstructor 2004 in a response 2028.

Note that for each additional data chunk identifier determined in step 1908, file constructor 2004 may generate an additional call to restore application 2006 in a similar manner as second call 2022 to retrieve the corresponding data chunk 322 from backup storage 2034. For instance, in response to a third call received from file reconstructor 2004, restore application 2006 may access backup storage 2034 to obtain the data chunk 322 identified in the third call. For instance, if the identified data chunk is stored in second chunk container 304b, restore application 2006 may generate an access 2030 to second chunk container 302b in backup storage 2034, and may retrieve a data chunk 2032 at the offset in second chunk container 302b indicated in the third call. Restore application 2006 may transmit data chunk 2032 to file reconstructor 2004 in another response. Additional calls corresponding to additional data chunk identifiers may be processed in a similar fashion to retrieve additional data chunks from backup storage 2034 for file reconstructor 2004.

In step 1914, the optimized stream metadata and the at least one data chunk are combined to restore the data stream. In an embodiment, stream map chunk 2018 and the one or more data chunks 322 (e.g., data chunk 2026 and 2032) retrieved from backup storage 2034 are combinable to restore the data stream. In a similar manner as described above for rehydration module 702, file reconstructor 2004 may use data stream offsets 402 (FIG. 4) included in the stream map of the stream map chunk 2018 to arrange the retrieved data chunks 322 in the proper order to re-generate the data stream, which is output by file reconstructor 2004 as data stream 2012. Data stream 2012 may be stored in primary storage, may be output to restore application 2006 to be stored in primary storage, or may be otherwise handled or delivered, as desired for the particular application.

For illustration purposes, an example restore of an optimized file is described with reference to flowchart 1900 of FIG. 19 and system 2000 of FIG. 20. The stream map chunk for the optimized file is stored in stream container 302, and the optimized file includes data chunks 322a and 322b of chunk container 304a and data chunk 322e of chunk container 304b. In this example, stream container 302 has the file name SC5, chunk container 304a has the file name CC3, and chunk container 304b has the file name CC7. As described above, restore application 2006 may restore optimized stream structure 2038 (having file name "OFN", for example) for the optimized file from backup storage 2034. In step 1902, restore application 2006 may generate request 2036 to file reconstructor 2004 (e.g., using ReconstructFile (OFN, Callback)) to start the file rebuild process for the optimized file. In step 1904, callback module 2008 may generate a first call to restore application 2006 requesting the stream map chunk identified in optimized stream structure 2038 for the optimized file (e.g., Callback→Read(internal-state, SC5, streammapchunkoffset, 64K, buffer), where a size of the stream map chunk is 64K). In step 1906, restore application 2006 retrieves the stream map chunk from stream container 304, and provides the stream map chunk to file reconstructor 2004 in a response. In step 1908, file reconstructor 2004 analyzes the stream map chunk to determine the three data chunk identifiers for data chunks 322a, 322b, and 322e included in the desired file. In step 1910, callback module 2008 generate three calls to restore application 2006 requesting data chunks 322a, 322b, and 322e, respectively (e.g., a first call of Callback→Read(internal-state, CC3, datachunk322aoffset, 64K, buffer), a second call of Callback→Read(internal-state, CC3, datachunk322boffset, 64K, buffer), and a third call of Callback→Read(internal-state, CC7, datachunk322eoffset, 64K, buffer)). In step 1912, file reconstructor 2004 receives data chunks 322a, 322b, and 322e from restore application 2006 in responses to the three calls. In step 1914, file reconstructor 2004 reassembles the optimized file into un-optimized form according to the stream map of the stream map chunk and stores the assembled file (e.g., writes the reassembled file back to optimized stream structure 2038 on disk).

It is noted that in the example of flowchart 1900, the data stream is reassembled (in step 1914). In another embodiment, instead of reassembling the data stream, optimized stream structure 2038 may be maintained in storage (primary or backup) as an optimized file, and the data chunks determined to be included in the data stream may be stored in a chunk store (not in backup storage 2034). In this manner, the optimized data stream remains in optimized form, referencing data chunks in a chunk store. In such an embodiment, the stream map chunk (received in step 1906) and the one or more data chunks (received in step 1912) are stored in the chunk store.

Figure 21:
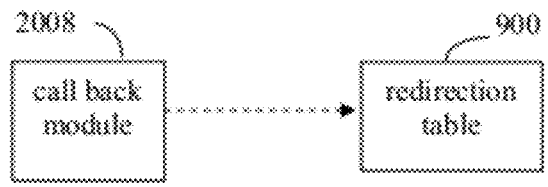
FIG. 21 shows a block diagram of a callback module that accesses a redistribution table, according to an embodiment.

As described further above, chunks may be moved within containers due to various functions, such as defragmentation and compaction. As such, a redirection table may be maintained that tracks such movement of chunks. In an embodiment, file reconstructor 2004 may be configured to access a redirection table to adjust calls to have chunks retrieved from adjusted offsets in a container. For instance, FIG. 21 shows a block diagram of callback module accessing redistribution table 900, according to an embodiment. Callback module 2008 may access a redistribution table 900 for each container in backup storage (e.g., each of stream container 302 and chunk containers 304a and 304b in the example of FIG. 20). In this manner, callback module 2008 may generate calls to adjusted offsets in containers rather than to obsolete offsets.

Figure 22:
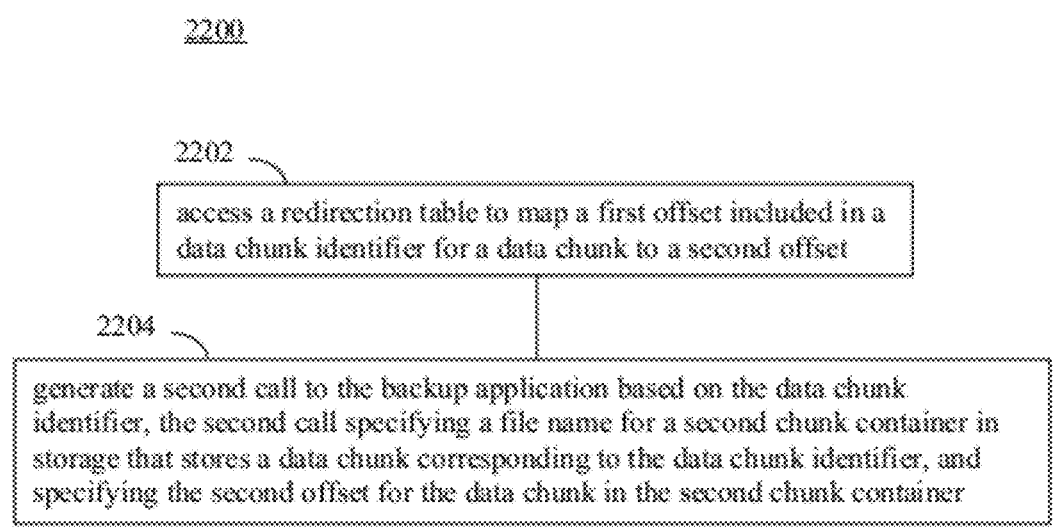
FIG. 22 shows a flowchart providing a process for accessing a redistribution table to obtain updated offsets for chunks, according to an example embodiment.

For instance, in an embodiment, callback module 2008 may perform a flowchart 2200 shown in FIG. 22. FIG. 22 shows flowchart 2200 providing a process for accessing a redistribution table for obtaining updated offsets for chunks, according to an example embodiment. Flowchart 2200 is described as follows.

In step 2202 of flowchart 2200, a redirection table is accessed to map a first offset included in a data chunk identifier for a data chunk to a second offset. For instance, callback module 2008 may access a redistribution table of a stream container from which a stream map chunk is to be retrieved (e.g., redirection table 308 in stream container 302 of FIG. 3) or a redistribution of a chunk container from which a data chunk is to be retrieved (e.g., redistribution table 320 in chunk container 304 of FIG. 3). Callback module 2008 may access the redistribution table in any manner, including by generating a call to retrieve the redistribution table. For instance, a call may be generated and transmitted to restore application 2006 that defines a file name of the container that contains the redistribution table, and an offset for the redistribution table in the container. Restore application 2006 may retrieve the redistribution table from backup storage 2034, and may provide the redistribution table to file reconstructor 2004. In this manner, callback module 2008 can access the redistribution table to determine updated chunk offsets.

In step 2204, a second call is generated to the restore application based on the data chunk identifier, the second call specifying a file name for a second chunk container in storage that stores a data chunk corresponding to the data chunk identifier, and specifying the second offset for the data chunk in the second chunk container. For instance, prior to a call for a data chunk, callback module 2008 may access the redistribution table for the data chunk to determine an updated, second offset for the data chunk (if a new offset is present in the redistribution table). Callback module 2008 may use the updated offset value in a call to restore application 2006 to retrieve the data chunk. The call may specify the file name of the chunk container 304 in backup storage 2034, and may specify the updated offset value obtained from the redistribution table. Restore application 2006 may receive the call, retrieve the data chunk from the indicated chunk container and updated offset, and provide the retrieved data chunk to file reconstructor 2004 in a response.

Note that in the example of flowchart 2200, a redistribution table of a chunk container is accessed to map a data chunk offset from a first offset to a second offset. Alternatively, flowchart 2200 may be modified such that a redistribution table of a stream container is accessed to map a stream map chunk from a first offset to a second offset. In an embodiment, redirection tables of containers may be retrieved upfront by callback module 2008, prior to generating calls for chunks.

In an embodiment, a size of chunks being retrieved from backup storage 2034 is determined prior to retrieving the chunks. For instance, in an embodiment, for each chunk, a first call may be made by callback module 2008 to restore application 2006 to determine a size of a chunk to be retrieved, and a second call may be made by callback module 2008 to restore application 2006 to retrieve the chunk from backup storage 2034 having the determined size.

For instance, in an embodiment, callback module 2008 may generate a first call that specifies the file name for the container in backup storage 2034 that stores the chunk, an offset for the chunk in the container, and a header size for the chunk (and optionally a buffer in which to output the chunk). For instance, the chunk header size may be a standard header size that is known by callback module 2008. The first call may be transmitted to restore application 2006 to retrieve the chunk header from backup storage 2034 as indicated by the first call. Restore application 2006 may retrieve the chunk header (e.g., either a stream map chunk header or data chunk header), and may provide the chunk header to callback module 2008 in a first response. The chunk header may indicate a size of the chunk. For instance, a stream map chunk header may indicate a size of the stream map chunk, and a data chunk header may indicate a size of the data chunk. Callback module 2008 may then generate a second call that specifies the file name for the container in backup storage 2034 that stores the chunk, an offset for the chunk in the container, and the size for the chunk determined from the chunk header (and optionally a buffer in which to output the chunk). Restore application 2006 may retrieve the chunk (e.g., either a stream map chunk or data chunk) at the indicated offset, and having the indicated size. Restore application 2006 may provide the retrieved chunk to callback module 2008 in a second response. In this manner, callback module 2008 may use restore application 2006 to determine chunk sizes, and two calls may be used to retrieve chunks: a first call may be used to determine chunk size, and a second call may be used to retrieve the chunk having the determined size.

Figure 23:
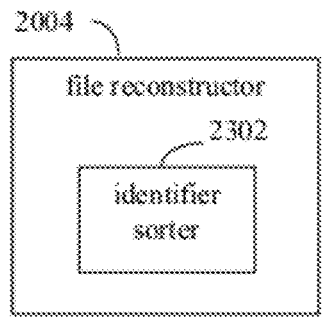
FIG. 23 shows a block diagram of a file reconstructor, according to an example embodiment.
Figure 24:
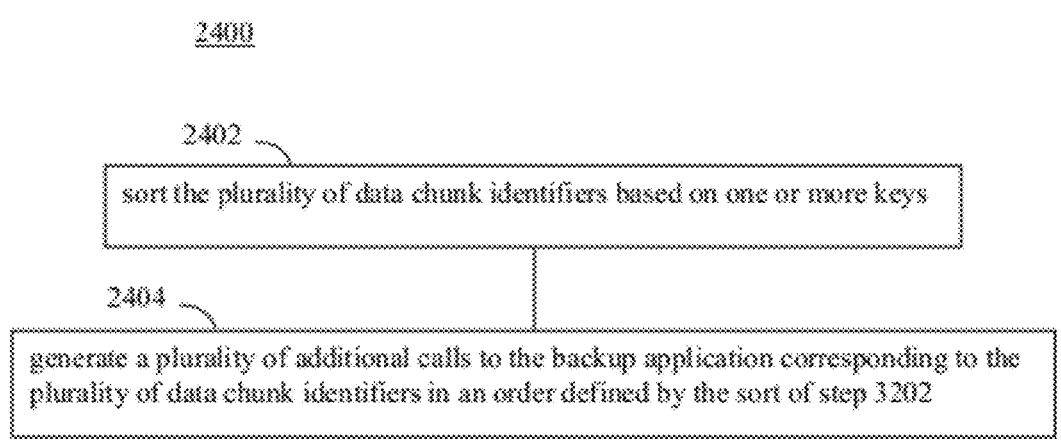
FIG. 24 shows a flowchart providing a process for sorting a data chunk restoration order, according to an example embodiment.

In one embodiment, callback module 2008 may generate calls to retrieve data chunks in any order, including in an order in which the data chunk identifiers are included in the stream map chunk. In another embodiment, file reconstructor 2004 may be configured to sort data chunk identifiers to that callback module 2008 retrieves the data chunks in a more efficient order. For instance, FIG. 23 shows a block diagram of file reconstructor 2004, according to an example embodiment. As shown in FIG. 23, file reconstructor 2004 includes an identifier sorter 2302. Identifier sorter 2302 is configured to sort an order in which data chunks are restored. For example, in an embodiment, identifier sorter 2302 may perform a flowchart 2400 shown in FIG. 24. FIG. 24 shows a flowchart 2400 providing a process for sorting a data chunk restoration order, according to an example embodiment. Flowchart 2400 is described as follows.

In step 2402 of flowchart 2400, the plurality of data chunk identifiers is sorted based on a determined chunk container as a first sort key and a chunk offset as a second key. In an embodiment, identifier sorter 2302 may sort the data chunk identifiers included in a stream map chunk according to one or more sort keys to enable the corresponding data chunks to be more efficiently retrieved. For instance, the data chunk identifiers may be sorted based on container file as a first sort key and based on chunk within the container file as second sort key. In further embodiments, the data chunk identifiers may be sorted using additional and/or alternative criteria or keys.

In step 2404, a plurality of additional calls to the restore application is generated corresponding to the plurality of data chunk identifiers in an order defined by step 2402. For example, the additional calls of step 1910 of flowchart 1900 (FIG. 19) may be generated in an order defined by the sorting of step 2402. In this manner, the data chunks may be more efficiently retrieved from backup storage 2034. For instance, the calls may be sorted so that the data chunks are retrieved in a sequential order matching a sequence in which the data chunks are stored in a sequential media, such as tape, and such that data chunks stored in a common backup media (e.g., a same tape, a same disk, etc.) are sequentially restored before restoring other data chunks. Such ordering can reduce a number of backup media switch and seeks within backup media, which is particularly desirable for restore from tape.

The performance of restore embodiments may be improved if the restore application can influence the restore order and/or receive an advanced notice of which file extents are about to be restored from each container file. For instance, one or more of the following callback functions may be used by the file reconstructor to improve restore, in embodiments:

"ContainersRestoreOrder" is a restore order callback that receives an array with all data chunk container file names as an input. The file names are of those containers that are needed for file reconstruction (the containers that store at least data chunk required for the file reconstruction). An output of this callback function is an array with the same container file names list, with the list sorted (e.g., re-ordered).

Using this restore order callback, in the case of a tape backup, the restore application may sort the container file names based on tape order, according to the backup tapes and an offset on tape where the container file is stored. If the restore process is performed according to this sort order, tape media replacement (e.g., by a user) and tape seek functions may be reduced or minimized. Minimizing the number of tape media changes and tape seeks increases the lifetime of the tape media and speeds up the restore process. In the case where the tapes containing these container files are physically located off-site and need to be requested and transported from an offsite location, this capability enables the restore application to provide a list of tapes that need to be retrieved from the offsite location to complete the restore of the data. This capability can significantly speed up data recovery because offsite tape retrieval can take hours or even days, and can lower the cost associated with media retrieval.

For example, the restore application may first group container files based on which backup tape they are located on, and within each tape, the container files may be sorted based on their location (start offset) on tape. The file reconstructor may then restore the data chunks based on the container order specified by the backup application. The back application may call the read callback function for the data chunks that are stored on the first data chunk container file in the sorted list, may next call the read callback for the data chunks that are stored on the second data chunk container file in the sorted list, and so forth.

In case of file backups or other backup techniques that do not benefit from ordering the restore, the restore application may choose to avoid sorting the data chunk container list and leave the container restore order arbitrary.

"ContainerRestorePlan" is a container restore plan callback that receives a single data chunk container file name and an array of offsets and sizes of data chunks as input. The array includes all data chunks stored in the named container and needed for reconstructing of the file.

The file reconstructor may call this callback once per data chunk container, before the read callback is called for the data chunks that are stored on the data chunk container. The ContainerRestorePlan callback generates a restore plan for use by the restore application. The restore application can use the restore plan output by the callback, which indicates the file extents of the data chunk container file needed to be read from the backup media. The restore application can use this restore plan for its own optimization of fetching the data chunks from the backup media, utilizing techniques such as batching, caching and read-ahead.

Processing this callback is optional. If the restore application cannot or does not need to optimize the reads from backup media, then the restore application can ignore the plan and process the read callbacks without optimizations.

"CreateChunksRestorePlan" is a data chunk restore plan callback that receives an array of structures as input. Each structure in the array corresponds to a single data chunk that is needed to reconstruct the file. Each structure may include the following members: container file name (indicating where the data chunk is stored), chunk offset in the container file, and chunk size. The output of the callback is an array of the same structures, sorted in the order in which the restore is to be performed.

The data chunk restore plan callback is an alternate to the restore order callback and the container restore plan callback. The data chunk restore plan callback serves at least two purposes: First, the callback indicates to the restore application which data chunks are to be restored. Based on the input to the callback, the restore application can determine which backup media has each chunk, and where each chunk is located is located on the corresponding media. The same optimization techniques for reading data from backup media may be used. Second, based on the output of the callback, the restore application may instruct the file reconstructor in which order to restore the chunks.

For example, in the case of tape backup, it is possible that a particular data chunk container file is stored on multiple tapes. Reconstructing a file may require two data chunks that are located on the same container file, but are backed up on 2 different tapes, because the container file is split between the tapes. If the restore application has the opportunity to dictate restore order at chunk data granularity, the restore application can group and sort data chunks in tape-order, even for those cases where the container file is split between multiple tapes, The file reconstructor may call the data chunk restore plan callback once per the restore process of the file. The file reconstructor may call the callback at the point where it knows which data chunks are needed, and where are the data chunks are located in the data chunk container files. The file reconstructor may use the output of the callback to provide the order of the data chunk restore. The file reconstructor may call the read callback function based on the order of data chunks dictated by the output structure list.

Processing of the data chunk restore plan callback is optional. If the restore application cannot or does not need to optimize the reads from backup media and dictate restore order, then the callback can be ignored or not performed. The file reconstructor may then restore the data chunks using its own logic described earlier, or in some arbitrary order.

III Example Computing Device Embodiments

Data deduplication module 104, maintenance module 106, data stream API 110, chunk maintenance API 112, data access API 114, chunk store interface 116, data stream parser 402, data chunk storage manager 404, metadata generator 406, stream map generator 408, rehydration module 702, data stream assembler 1102, generation checker 1106, data chunk retriever 1108, data backup module 1302, optimized file backup module 1306, rehydrating backup module 1308, item level backup module 1310, data chunk identifier backup module 1312, heuristics module 1314, data restore module 2002, file reconstructor 2004, restore application 2006, callback module 2008, and identifier sorter 2302 may be implemented in hardware, software, firmware, or any combination thereof. For example, data deduplication module 104, maintenance module 106, data stream API 110, chunk maintenance API 112, data access API 114, chunk store interface 116, data stream parser 402, data chunk storage manager 404, metadata generator 406, stream map generator 408, rehydration module 702, data stream assembler 1102, generation checker 1106, data chunk retriever 1108, data backup module 1302, optimized file backup module 1306, rehydrating backup module 1308, item level backup module 1310, data chunk identifier backup module 1312, heuristics module 1314, data restore module 2002, file reconstructor 2004, restore application 2006, callback module 2008, and/or identifier sorter 2302 may be implemented as computer program code configured to be executed in one or more processors. Alternatively, data deduplication module 104, maintenance module 106, data stream API 110, chunk maintenance API 112, data access API 114, chunk store interface 116, data stream parser 402, data chunk storage manager 404, metadata generator 406, stream map generator 408, rehydration module 702, data stream assembler 1102, generation checker 1106, data chunk retriever 1108, data backup module 1302, optimized file backup module 1306, rehydrating backup module 1308, item level backup module 1310, data chunk identifier backup module 1312, heuristics module 1314, data restore module 2002, file reconstructor 2004, restore application 2006, callback module 2008, and/or identifier sorter 2302 may be implemented as hardware logic/electrical circuitry.

Figure 25:
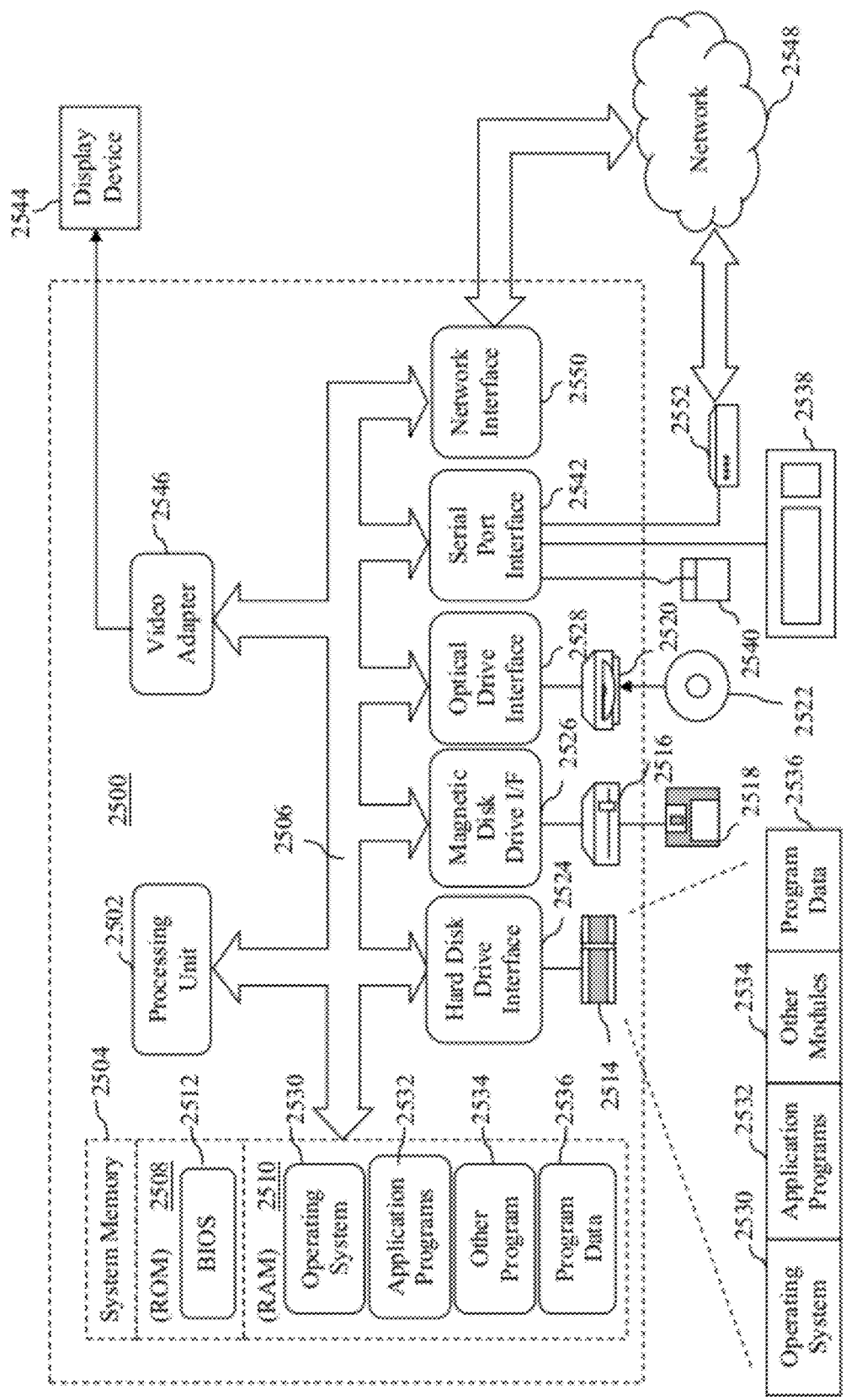
FIG. 25 shows a block diagram of an example computer that may be used to implement embodiments of the present invention.

FIG. 25 depicts an exemplary implementation of a computer 2500 in which embodiments of the present invention may be implemented. For example, storage system 102, and/or any portion thereof, may be implemented in one or more computer systems similar to computer 2500, including one or more features of computer 2500 and/or alternative features. Computer 2500 may be a general-purpose computing device in the form of a conventional personal computer, a mobile computer, or a workstation, for example, or computer 2500 may be a special purpose computing device. The description of computer 2500 provided herein is provided for purposes of illustration, and is not intended to be limiting. Embodiments of the present invention may be implemented in further types of computer systems, as would be known to persons skilled in the relevant art(s).

As shown in FIG. 25, computer 2500 includes a processing unit 2502, a system memory 2504, and a bus 2506 that couples various system components including system memory 2504 to processing unit 2502. Bus 2506 represents one or more of any of several types of bus structures, including a memory bus or memory controller, a peripheral bus, an accelerated graphics port, and a processor or local bus using any of a variety of bus architectures. System memory 2504 includes read only memory (ROM) 2508 and random access memory (RAM) 2510. A basic input/output system 2512 (BIOS) is stored in ROM 2508.

Computer 2500 also has one or more of the following drives: a hard disk drive 2514 for reading from and writing to a hard disk, a magnetic disk drive 2516 for reading from or writing to a removable magnetic disk 2518, and an optical disk drive 2520 for reading from or writing to a removable optical disk 2522 such as a CD ROM, DVD ROM, or other optical media. Hard disk drive 2514, magnetic disk drive 2516, and optical disk drive 2520 are connected to bus 2506 by a hard disk drive interface 2524, a magnetic disk drive interface 2526, and an optical drive interface 2528, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 2530, one or more application programs 2532, other program modules 2534, and program data 2536. Application programs 2532 or program modules 2534 may include, for example, computer program logic for implementing data deduplication module 104, maintenance module 106, data stream API 110, chunk maintenance API 112, data access API 114, chunk store interface 116, data stream parser 402, data chunk storage manager 404, metadata generator 406, stream map generator 408, rehydration module 702, data stream assembler 1102, generation checker 1106, data chunk retriever 1108, data backup module 1302, optimized file backup module 1306, rehydrating backup module 1308, item level backup module 1310, data chunk identifier backup module 1312, heuristics module 1314, data restore module 2002, file reconstructor 2004, restore application 2006, callback module 2008, identifier sorter 2302, flowchart 500, flowchart 1000, flowchart 1200, flowchart 1400, flowchart 1500, flowchart 1600, flowchart 1700, flowchart 1800, flowchart 1900, flowchart 2200, flowchart 2400 (including any step of flowcharts 500, 1000, 1200, 1400, 1500, 1600, 1700, 1800, 1900, 2200, and 2400), and/or further embodiments described herein.

A user may enter commands and information into the computer 2500 through input devices such as keyboard 2538 and pointing device 2540. Other input devices (not shown) may include a microphone, joystick, game pad, satellite dish, scanner, or the like. These and other input devices are often connected to the processing unit 2502 through a serial port interface 2542 that is coupled to bus 2506, but may be connected by other interfaces, such as a parallel port, game port, or a universal serial bus (USB).

A display device 2544 is also connected to bus 2506 via an interface, such as a video adapter 2546. In addition to the monitor, computer 2500 may include other peripheral output devices (not shown) such as speakers and printers.

Computer 2500 is connected to a network 2548 (e.g., the Internet) through an adaptor or network interface 2550, a modem 2552, or other means for establishing communications over the network. Modem 2552, which may be internal or external, is connected to bus 2506 via serial port interface 2542.

As used herein, the terms "computer program medium," "computer-readable medium," and "computer-readable storage medium" are used to generally refer to media such as the hard disk associated with hard disk drive 2514, removable magnetic disk 2518, removable optical disk 2522, as well as other media such as flash memory cards, digital video disks, random access memories (RAMs), read only memories (ROM), and the like. Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 2532 and other program modules 2534) may be stored on the hard disk, magnetic disk, optical disk, ROM, or RAM. Such computer programs may also be received via network interface 2550 or serial port interface 2542. Such computer programs, when executed or loaded by an application, enable computer 2500 to implement features of embodiments of the present invention discussed herein. Accordingly, such computer programs represent controllers of the computer 2500.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, flash storage (e.g., flash memory), solid-state drives (SSDs), hard drives, floppy disks, CD ROMs, DVD ROMs, zip disks, tapes, magnetic storage devices, optical storage devices, MEMs, nanotechnology-based storage devices, and the like.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for data stream backup, comprising:
identifying for backup a plurality of optimized data streams stored in a chunk store, the chunk store including each optimized data stream as a plurality of chunks and corresponding optimized stream metadata, the plurality of chunks including at least one data chunk, the corresponding optimized stream metadata referencing the at least one data chunk, and the chunk store including all included data chunks in a deduplicated manner before the identification for the backup; and
storing at least a portion of the chunk store in a backup storage to backup the plurality of optimized data streams identified for backup,
wherein said storing comprises
determining whether the plurality of optimized data streams were selected for backup according to an exclude mode or an include mode, the exclude mode being a first backup mode where at least one volume is specifically selected for backup and one or more data streams are specifically selected to be excluded from backup, and the include mode being a second backup mode where at least one data stream is specifically selected for backup; and
selecting the backup technique based on which of the exclude mode or include mode was determined to be selected.

2. The method of claim 1, wherein said storing comprises:
storing the chunk store in its entirety in the backup storage; and
storing a plurality of stream metadata stubs in the backup storage for the plurality of optimized data streams, wherein each stream metadata stub links a data stream to corresponding data in the chunk store.

3. The method of claim 1, wherein said storing comprises:
rehydrating each optimized data stream into a corresponding un-optimized data stream that includes any data chunks referenced by the corresponding optimized stream metadata; and
storing each un-optimized data stream in the backup storage to backup the plurality of optimized data streams.

4. The method of claim 1, wherein said storing comprises:
receiving a first optimized data stream identified for backup;
determining one or more data chunks referenced by the optimized stream metadata of the first optimized data stream and not already stored in the backup storage;
storing the optimized stream metadata of the first optimized data stream in the backup storage; and
storing the determined one or more data chunks in the backup storage.

5. The method of claim 1, wherein said storing comprises:
analyzing the optimized stream metadata corresponding to each optimized data stream to determine a corresponding at least one data chunk identifier for the at least one data chunk referenced by the optimized stream metadata;
storing an optimized stream structure for each optimized data stream in the backup storage with the corresponding at least one data chunk identifier; and
storing one or more chunk containers of the chunk store in the backup storage that store data chunks of the optimized data streams.

6. The method of claim 1, wherein said selecting the backup technique based on which of the exclude mode or include mode was determined to be selected comprises:
selecting the backup technique to be an optimized data stream backup technique if the exclude mode was determined to be selected; and
selecting the backup technique to be an un-optimized data stream backup technique if the include mode was determined to be selected.

7. The method of claim 1, wherein said identifying comprises:
identifying each optimized data stream by file name.

8. The method of claim 1, wherein the include mode includes a lesser number of one or more data streams than the exclude mode.

9. A method for restoring files from backup, comprising:
receiving a request for an optimized data stream to be retrieved from a chunk store in backup storage, the request including an identifier for the optimized stream metadata corresponding to the data stream;
generating a first call to a restore application based on the optimized stream metadata, the first call specifying a file name for a first chunk container in backup storage that stores optimized stream metadata identified by the optimized stream metadata identifier, and specifying an offset for the optimized stream metadata in the first chunk container;
receiving the optimized stream metadata in response to the first call;
determining at least one data chunk identifier referenced in the optimized stream metadata;
generating at least one additional call to the restore application corresponding to the at least one data chunk identifier to obtain at least one data chunk from at least one chunk container in backup storage; and
receiving the at least one data chunk in response to the at least one additional call.

10. The method of claim 9, wherein said generating at least one additional call to the restore application corresponding to the at least one data chunk identifier to obtain at least one data chunk from at least one chunk container in backup storage comprises:
generating a second call to the restore application based on a corresponding data chunk identifier, the second call specifying a file name for a second chunk container in backup storage that stores a data chunk identified by the data chunk identifier, and specifying an offset for the identified data chunk in the second chunk container.

11. The method of claim 9, wherein said generating at least one additional call to the restore application corresponding to the at least one data chunk identifier to obtain at least one data chunk from at least one chunk container in backup storage comprises:
accessing a redirection table to map a first offset included in a data chunk identifier for a data chunk to a second offset;
generating a second call to the restore application based on the data chunk identifier, the second call specifying a file name for a second chunk container in backup storage that stores a data chunk corresponding to the data chunk identifier, and specifying the second offset for the data chunk in the second chunk container.

12. The method of claim 9, wherein the first call specifies the file name for the first chunk container in backup storage that stores the optimized stream metadata as a stream map chunk, the offset for the stream map chunk in the first chunk container, and a header size for the stream map chunk, wherein said generating a first call comprises:
generating the first call to obtain a stream map header for the stream map chunk;
determining a size of the stream map chunk from the stream map header; and
generating a second call to obtain the stream map chunk, the second call specifying the file name for the first chunk container in backup storage that stores the stream map chunk, the offset for the stream map chunk in the first chunk container, and the size of the stream map chunk.

13. The method of claim 9, wherein a plurality of data chunk identifiers are referenced in the optimized stream metadata, the method further comprising:
sorting the plurality of data chunk identifiers based on a determined chunk container as a first sort key and a chunk offset as a second key; and
wherein said generating at least one additional call to the restore application corresponding to the at least one data chunk identifier to obtain at least one data chunk from at least one chunk container in backup storage comprises:
generating a plurality of additional calls to the restore application corresponding to the plurality of data chunk identifiers in an order defined by said sorting.

14. The method of claim 9, further comprising:
generating an additional call to the restore application to generate a sorted list of chunk containers;
wherein said generating at least one additional call to the restore application corresponding to the at least one data chunk identifier to obtain at least one data chunk from at least one chunk container in backup storage comprises:
generating a plurality of additional calls to the restore application corresponding to the plurality of data chunks in an order defined by the sorted list.

15. The method of claim 9, further comprising:
generating an additional call to the restore application that includes a list of all data chunks of the data stream to be restored and associated with at least one chunk container, and includes at least one of a file name of a container, a chunk offset in the container for at least one data chunk, and a data chunk size for the at least one data chunk in the container.

16. A system, comprising:
a data backup module that receives an identification of a plurality of optimized data streams stored in a chunk store for backup, the chunk store including each optimized data stream as a plurality of chunks and corresponding optimized stream metadata, the plurality of chunks including at least one data chunk, the corresponding optimized stream metadata referencing the at least one data chunk, the chunk store including all included data chunks in a deduplicated configuration before the identification for the backup; and
the data backup module being configured to store at least a portion of the chunk store in a backup storage to backup the plurality of optimized data streams identified for backup, determine a first amount of space in the chunk store consumed by data chunks that are not referenced by the plurality of optimized data streams identified for backup, determine a second amount of space as an amount of space to store all of the plurality of optimized data streams in un-optimized form minus an amount of space to store all of the plurality of optimized data streams in optimized form, and select a backup technique based on the determined first and second amounts of space.

17. The system of claim 16, wherein the data backup module is further configured to:
select the backup technique to be an optimized data stream backup technique if the determined first amount of space is less than the determined second amount of space; and
select the backup technique to be an un-optimized data stream backup technique if the determined first amount of space is greater than the determined second amount of space.

18. The system of claim 16, wherein the data backup module comprises at least one of
an optimized file backup module configured to store the chunk store in its entirety in the backup storage;
a rehydrating backup module configured to rehydrate each optimized data stream into a corresponding un-optimized data stream that includes any data chunks referenced by the corresponding optimized stream metadata, and to store each un-optimized data stream in the backup storage;
an item level backup module configured for each optimized data stream to determine one or more data chunks referenced by the optimized stream metadata of the optimized data stream and not already stored in the backup storage, to store the optimized stream metadata of the optimized data stream in the backup storage, and to store the determined one or more data chunks in the backup storage; or
a data chunk identifier backup module configured to analyze the optimized stream metadata of each optimized data stream to determine a corresponding at least one data chunk identifier for the at least one data chunk referenced by the optimized stream metadata, to store each optimized data stream in the backup storage with the corresponding at least one data chunk identifier, and to store one or more chunk containers of the chunk store in the backup storage that store data chunks of the optimized data streams.

19. The system of claim 16, further comprising:
a file reconstructor that receives a request for a data stream to be retrieved from a chunk store in the backup storage, the request including an identifier for optimized stream metadata corresponding to the data stream;
the file reconstructor including a callback module that generates a first call to a restore application based on the optimized stream metadata identifier, the first call specifying a file name for a first chunk container in the backup storage that stores optimized stream metadata identified by the optimized stream metadata identifier, and specifying an offset for the optimized stream metadata in the first chunk container;
the file reconstructor receiving the optimized stream metadata in response to the first call, and determining at least one data chunk identifier referenced in the optimized stream metadata;
the callback module generating at least one additional call to the restore application corresponding to the at least one data chunk identifier to obtain at least one data chunk from at least one chunk container in the backup storage; and the file reconstructor receiving the at least one data chunk in response to the at least one additional call, and combining the at least one data chunk to restore the data stream.

20. The system of claim 16, wherein the data backup module identifies each optimized data stream by file name.

\* \* \* \* \*